(12) United States Patent
Rachamadugu et al.

(10) Patent No.: US 11,805,024 B1
(45) Date of Patent: *Oct. 31, 2023

(54) AUTOMATICALLY GENERATING AN INTENT-BASED NETWORK MODEL OF AN EXISTING COMPUTER NETWORK

(71) Applicant: Apstra, Inc., Menlo Park, CA (US)

(72) Inventors: Raghavendra Rachamadugu, Fremont, CA (US); Aleksandar Luka Ratkovic, Palo Alto, CA (US)

(73) Assignee: Apstra, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/301,375

(22) Filed: Mar. 31, 2021

Related U.S. Application Data

(63) Continuation of application No. 16/360,660, filed on Mar. 21, 2019, now Pat. No. 10,992,543.

(51) Int. Cl.
| | |
|---|---|
| H04L 12/24 | (2006.01) |
| H04L 41/14 | (2022.01) |
| H04L 41/0803 | (2022.01) |
| H04L 41/0853 | (2022.01) |
| H04L 41/12 | (2022.01) |
| H04L 41/0695 | (2022.01) |
| H04L 41/0869 | (2022.01) |
| H04L 43/04 | (2022.01) |

(52) U.S. Cl.
CPC ........ *H04L 41/145* (2013.01); *H04L 41/0695* (2013.01); *H04L 41/0803* (2013.01); *H04L 41/0853* (2013.01); *H04L 41/0869* (2013.01); *H04L 41/12* (2013.01); *H04L 43/04* (2013.01)

(58) Field of Classification Search
CPC .............. H04L 41/145; H04L 41/0695; H04L 41/0803; H04L 41/0853; H04L 41/0869; H04L 41/12; H04L 43/04; H04L 41/0233; H04L 41/0893; H04L 43/0817
See application file for complete search history.

(56) References Cited

U.S. PATENT DOCUMENTS

| | | | |
|---|---|---|---|
| 7,636,771 B2 | 12/2009 | Torii | |
| 7,870,238 B2 | 1/2011 | Pusateri et al. | |
| 8,024,171 B1 * | 9/2011 | Korolev | G06F 11/366 |
| | | | 703/24 |

(Continued)

FOREIGN PATENT DOCUMENTS

| | | | | |
|---|---|---|---|---|
| EP | 2961100 A1 * | 12/2015 | ......... | G06F 16/9024 |
| WO | 2007140337 A2 | 12/2007 | | |

OTHER PUBLICATIONS

Jacobs et al. "Refining Network Intents for Self-Driving Networks" In ACM SIGCOMM Computer Communication Review, vol. 48, Issue 5, pp. 55-63, Oct. 2018 (Year: 2018).*

(Continued)

*Primary Examiner* — Wutchung Chu
(74) *Attorney, Agent, or Firm* — Shumaker & Sieffert, P.A.

(57) ABSTRACT

Collectors are provided to network devices of an existing computer network. A reference network type associated with the existing computer network is determined. Based at least in part on telemetry and configuration information received from the collectors and the reference network type, an intent-based network model of the existing computer network is generated. The existing computer network is validated using the generated intent-based network model.

20 Claims, 44 Drawing Sheets

(56) References Cited

U.S. PATENT DOCUMENTS

| | | | |
|---|---|---|---|
| 8,156,207 B2 | 4/2012 | Wood et al. | |
| 8,386,593 B1 | 2/2013 | Gao et al. | |
| 8,737,993 B2 | 5/2014 | Alves et al. | |
| 8,782,182 B2 | 7/2014 | Chaturvedi et al. | |
| 8,819,202 B1 | 8/2014 | Carolan et al. | |
| 8,849,973 B2 | 9/2014 | Leib et al. | |
| 8,869,236 B1 | 10/2014 | Tonogai et al. | |
| 9,037,969 B2 | 5/2015 | Wolff-Petersen et al. | |
| 9,135,293 B1* | 9/2015 | Kienzle | G06F 16/245 |
| 10,063,428 B1* | 8/2018 | Karam | H04L 43/0817 |
| 10,171,309 B1* | 1/2019 | Smith | H04L 41/12 |
| 10,203,946 B2* | 2/2019 | DeHaan | H04L 41/0806 |
| 10,277,461 B1 | 4/2019 | A et al. | |
| 10,313,206 B1 | 6/2019 | Karam et al. | |
| 10,333,776 B2 | 6/2019 | Karam et al. | |
| 10,374,872 B2 | 8/2019 | Ratkovic et al. | |
| 10,389,573 B2 | 8/2019 | Karam et al. | |
| 10,516,761 B1 | 12/2019 | A et al. | |
| 10,548,034 B2* | 1/2020 | Ganapathi | H04L 43/022 |
| 10,558,542 B1 | 2/2020 | A et al. | |
| 10,560,370 B1* | 2/2020 | A | H04L 45/28 |
| 10,630,540 B2 | 4/2020 | Karam et al. | |
| 10,698,714 B2 | 6/2020 | Krishnamurthy et al. | |
| 10,756,983 B2 | 8/2020 | Ratkovic et al. | |
| 10,985,974 B2 | 4/2021 | Karam et al. | |
| 10,992,543 B1 | 4/2021 | Rachamadugu et al. | |
| 11,086,709 B1* | 8/2021 | Ratkovic | G06F 11/079 |
| 11,102,053 B2* | 8/2021 | Ponnuswamy | H04L 43/04 |
| 2002/0112053 A1 | 8/2002 | Christensen et al. | |
| 2002/0178380 A1 | 11/2002 | Wolf et al. | |
| 2003/0046390 A1* | 3/2003 | Ball | H04L 41/12 709/224 |
| 2004/0059812 A1 | 3/2004 | Assa | |
| 2005/0091068 A1 | 4/2005 | Ramamoorthy | |
| 2006/0080425 A1 | 4/2006 | Wood et al. | |
| 2006/0241931 A1 | 10/2006 | Abu el Ata et al. | |
| 2007/0130192 A1 | 6/2007 | Bolder et al. | |
| 2007/0150561 A1 | 6/2007 | Courtney | |
| 2008/0126406 A1* | 5/2008 | Endabetla | G06Q 10/06 |
| 2009/0059814 A1 | 3/2009 | Nixon et al. | |
| 2009/0198797 A1 | 8/2009 | Wang et al. | |
| 2009/0282129 A9 | 11/2009 | Tindal | |
| 2010/0293364 A1 | 11/2010 | Maini | |
| 2010/0306275 A1* | 12/2010 | Maheshwari | G06F 16/217 715/239 |
| 2013/0060929 A1 | 3/2013 | Koponen et al. | |
| 2014/0007222 A1* | 1/2014 | Qureshi | H04L 67/10 726/16 |
| 2014/0096249 A1 | 4/2014 | Dupont et al. | |
| 2014/0200858 A1 | 7/2014 | Chatow et al. | |
| 2014/0280920 A1* | 9/2014 | Foley | H04L 43/0811 709/224 |
| 2014/0337467 A1* | 11/2014 | Pech | G06F 9/45529 709/217 |
| 2015/0015376 A1* | 1/2015 | Jenkins | G08C 17/02 340/12.5 |
| 2015/0163088 A1* | 6/2015 | Anschutz | G06F 11/3003 709/224 |
| 2015/0188774 A1 | 7/2015 | Nadaf et al. | |
| 2015/0248487 A1 | 9/2015 | Baranowski et al. | |
| 2015/0295771 A1* | 10/2015 | Cuni | H04L 41/12 709/224 |
| 2015/0379409 A1 | 12/2015 | Hu et al. | |
| 2016/0119204 A1* | 4/2016 | Murasato | H04L 41/12 715/735 |
| 2016/0142243 A1* | 5/2016 | Karam | G06F 16/13 709/202 |
| 2016/0188767 A1 | 6/2016 | Razin | |
| 2016/0219078 A1* | 7/2016 | Porras | H04L 41/12 |
| 2016/0285704 A1* | 9/2016 | Gasparakis | H04L 41/142 |
| 2016/0330125 A1* | 11/2016 | Mekkattuparamban | H04L 45/32 |
| 2016/0342510 A1 | 11/2016 | Pani | |
| 2016/0344772 A1* | 11/2016 | Monahan | G06F 16/248 |
| 2017/0109907 A1* | 4/2017 | Hamedani | G06T 9/00 |
| 2017/0111233 A1* | 4/2017 | Kokkula | H04L 43/08 |
| 2017/0250881 A1 | 8/2017 | Kellicker | |
| 2017/0316324 A1* | 11/2017 | Barrett | G06N 20/20 |
| 2017/0331828 A1* | 11/2017 | Caldera | H04L 63/0807 |
| 2017/0345082 A1* | 11/2017 | Hoxworth | G06Q 30/0635 |
| 2017/0346684 A1* | 11/2017 | Ratkovic | H04L 41/0895 |
| 2018/0123941 A1* | 5/2018 | Flamini | H04L 41/0806 |
| 2018/0137155 A1* | 5/2018 | Majumdar | G06F 16/9024 |
| 2018/0139254 A1* | 5/2018 | Oyman | H04N 21/23439 |
| 2018/0210927 A1 | 7/2018 | Karam et al. | |
| 2018/0316576 A1 | 11/2018 | Kang et al. | |
| 2018/0367390 A1* | 12/2018 | Ponnuswamy | H04L 41/40 |
| 2018/0367417 A1* | 12/2018 | Dixit | H04L 41/122 |
| 2019/0068453 A1* | 2/2019 | Papaloukopoulos | H04L 43/18 |
| 2019/0068543 A1 | 2/2019 | Papaloukopoulos | |
| 2019/0173805 A1 | 6/2019 | Balan et al. | |
| 2019/0223023 A1* | 7/2019 | Altay | H04L 41/5051 |
| 2019/0229949 A1* | 7/2019 | Shimizu | H04L 12/44 |
| 2019/0238423 A1 | 8/2019 | Karam et al. | |
| 2019/0306015 A1 | 10/2019 | Ratkovic et al. | |
| 2019/0319830 A1 | 10/2019 | Karam et al. | |
| 2019/0319868 A1* | 10/2019 | Svennebring | H04L 41/147 |
| 2020/0007495 A1 | 1/2020 | Balamurugan et al. | |
| 2020/0136917 A1 | 4/2020 | Kang et al. | |
| 2020/0202846 A1* | 6/2020 | Bapna | G10L 15/1815 |
| 2020/0213189 A1 | 7/2020 | Karam et al. | |
| 2020/0274772 A1 | 8/2020 | A et al. | |
| 2020/0313957 A1 | 10/2020 | A et al. | |
| 2020/0313980 A1 | 10/2020 | A et al. | |
| 2020/0326924 A1 | 10/2020 | A et al. | |
| 2020/0328949 A1 | 10/2020 | Ratkovic et al. | |
| 2020/0344171 A1 | 10/2020 | Sharma et al. | |
| 2022/0006693 A1* | 1/2022 | Toeroe | H04L 41/0893 |
| 2022/0094614 A1* | 3/2022 | Khurshid | H04L 41/147 |
| 2022/0224608 A1* | 7/2022 | Karam | H04L 67/56 |

OTHER PUBLICATIONS

Bjorklund, "YANG—A Data Modeling Language for the Network Configuration Protocol (NETCONF)," Internet Engineering Task Force (IETF), RFC 6020, Oct. 2010, 174 pp.

Enns et al., "Network Configuration Protocol (NETCONF)," Internet Engineering Task Force (IETF), RFC 6241, Jun. 2011, 114 pp.

Enns, "NETCONF Configuration Protocol," Network Working Group, RFC 4741, Dec. 2006, 96 pp.

Harrington et al., "An Architecture for Describing Simple Network Management Protocol (SNMP) Management Frameworks," Network Working Group, RFC 3411, Dec. 2002, 65 pp.

Prakash et al., "PGA: Using Graphs to Express and Automatically Reconcile Network Policies," SIGCOMM 2015, Aug. 17-21, 2015, London, United Kingdom, 14 pp.

U.S. Appl. No. 17/104,804, filed Nov. 25, 2020, naming inventors Hafeez et al.

U.S. Appl. No. 16/400,936, filed May 1, 2019, naming inventors Ratkovic et al.

U.S. Appl. No. 17/301,355, filed Mar. 31, 2021, naming inventors Karam et al.

Prosecution History from U.S. Appl. No. 16/360,660, dated Jun. 10, 2020 through Mar. 17, 2021, 43 pp.

\* cited by examiner hostname

```
Object({
    'chassis': String(),
    'hostname': String()
})
``` lldp_details

```
{
    "properties": {
        "identity": {
            "type": "string"
        },
        "value": {
            "properties": {
                "chassis_id": {
                    "type": "string"
                },
                "chassis_id_type": {
                    "type": "string"
                },
                "interface_name": {
                    "type": "string"
                },
                "neighbor_interface_name": {
                    "type": "string"
                },
                "neighbor_system_id": {
                    "type": "string"
                },
                "sys_description": {
                    "type": "string"
                }
            },
            "required": [
                "interface_name",
                "neighbor_system_id",
                "sys_description",
                "neighbor_interface_name",
                "chassis_id",
                "chassis_id_type"
            ],
            "type": "object"
        }
    },
    "required": [
        "identity",
        "value"
    ],
    "type": "object"
}
```

FIG. 7A bgp

```
Object({
    'items': List(Optional(Object({
        'source_ip': Optional(Ipv4OrIpv6Address()),
        'source_asn': StringAsn(),
        'dest_ip': Ipv4OrIpv6Address(),
        'dest_asn': StringAsn(),
        'vrf_name': String(
            validate=Length(min=1),
            description='VRF name',
        ),
        'addr_family': Enum(
            ('ipv4', 'ipv6', 'evpn'),
            description='Address family'),
        'value': Enum(('unknown', 'down', 'up', 'missing'))
    })))
})
```

FIG. 7A
(Cont)

interface_details

```
{
    "properties": {
        "identity": {
            "type": "string"
        },
        "value": {
            "properties": {
                "allowed_vlans": {
                    "items": {
                        "type": "integer"
                    },
                    "type": "array"
                },
                "description": {
                    "oneOf": [
                        {
                            "type": "string"
                        },
                        {
                            "type": "null"
                        }
                    ]
                },
                "ipv4_addr": {
                    "oneOf": [
                        {
                            "pattern": "^((0|([1-9][0-9]?)|(1[0-9]{2})|(2[0-4][0-9])|(5[0-5]))\\.){3}(0|([1-9][0-9]?)|(1[0-9]{2})|(2[0-4][0-9])|(5[0-5]))/[1-9]|([1-2][0-9])|(3[0-2])$",
                            "type": "string"
                        },
                        {
                            "type": "null"
                        }
                    ]
                },
                "mlag_id": {
                    "oneOf": [
                        {
                            "type": "integer"
                        },
                        {
                            "type": "null"
                        }
                    ]
                },
                "mode": {
                    "enum": [
                        "access",
```

FIG. 7A
(Cont)

```
                    "trunk"
                ],
                "type": "string"
            },
            "name": {
                "type": "string"
            },
            "native_vlan": {
                "oneOf": [
                    {
                        "type": "integer"
                    },
                    {
                        "type": "null"
                    }
                ]
            },
            "parent": {
                "oneOf": [
                    {
                        "type": "string"
                    },
                    {
                        "type": "null"
                    }
                ]
            },
            "speed_mbps": {
                "description": "Speed in megabits per second, e.g. 1Gbps would become 'speed_mbps=1000'",
                "oneOf": [
                    {
                        "type": "integer"
                    },
                    {
                        "type": "null"
                    }
                ]
            },
            "subinterface_id": {
                "description": "Only valid for a type = subinterface",
                "oneOf": [
                    {
                        "type": "string"
                    },
                    {
                        "type": "null"
                    }
                ]
            },
            "type": {
                "enum": [
                    "ip",
                    "ethernet",
                    "loopback",
                    "svi",
                    "port_channel",
                    "subinterface",
                    "management"
                ],
```

FIG. 7A
(Cont)

```
            "type": "string"
        },
        "virtual_ips": {
            "items": {
                "format": "ipv4",
                "type": "string"
            },
            "type": "array"
        },
        "virtual_macs": {
            "items": {
                "pattern": "^([0-9a-f]{2}:){5}[0-9a-f]{2}$",
                "type": "string"
            },
            "type": "array"
        },
        "vlan_id": {
            "oneOf": [
                {
                    "type": "integer"
                },
                {
                    "type": "null"
                }
            ]
        }
    },
    "required": [
        "name",
        "type",
        "mode"
    ],
    "type": "object"
    }
},
"required": [
    "identity",
    "value"
],
"type": "object"
}
```

FIG. 7A
(Cont)

mlag_domain

```
{
    "oneOf": [
        {
            "properties": {
                "identity": {
                    "oneOf": [
                        {
                            "description": "MLAG domain id (aka redundancy group id). Need not be unique in the fabric",
                            "enum": ["domain_id"]
                        },
                        {
                            "description": "Globally unique MLAG domain id",
                            "enum": ["system_id"]
                        },
                        {
                            "description": "Local interface name over which MLAG control packets are transmitted over. This is typically an svi interface",
                            "enum": ["local_interface"]
                        },
                        {
                            "description": "Name of the physical interface used for MLAG control traffic. This is typically a port-channel/aggregate interface",
                            "enum": ["peer_link"]
                        }
                    ],
                    "type": "string"
                },
                "value": {
                    "oneOf": [
                        {
                            "type": "string"
                        },
                        {
                            "type": "null"
                        }
                    ]
                }
            }
        },
        {
            "properties": {
                "identity": {
```

FIG. 7A
(Cont)

```
                    "oneOf": [
                        {
                            "description": "1 if RS is up/active and 0 otherwise",
                            "enum": ["domain_state"]
                        },
                        {
                            "description": "1 if interface is up, 0 otherwise",
                            "enum": ["local_interface_status"]
                        },
                        {
                            "description": "1 if link is up, 0 otherwise",
                            "enum": ["peer_link_status"]
                        }
                    ],
                    "type": "string"
                },
                "value": {
                    "oneOf": [
                        {
                            "enum": [
                                "1",
                                "0"
                            ],
                            "type": "string"
                        },
                        {
                            "type": "null"
                        }
                    ]
                }
            }
        },
        {
            "properties": {
                "identity": {
                    "description": "VLAN id if localInterface is an svi",
                    "enum": [
                        "local_interface_vlan_id"
                    ],
                    "type": "string"
                },
                "value": {
                    "oneOf": [
                        {
                            "pattern": "^[1-9][0-9]*$",
                            "type": "string"
                        },
                        {
                            "type": "null"
                        }
                    ]
                }
            },
```

FIG. 7A
(Cont)

```
{
    "properties": {
        "identity": {
            "description": "Address of the peer to which MLAG control traffic is sent",
            "enum": [
                "peer_address"
            ],
            "type": "string"
        },
        "value": {
            "oneOf": [
                {
                    "oneOf": [
                        {
                            "format": "ipv4"
                        },
                        {
                            "format": "ipv6"
                        }
                    ],
                    "type": "string"
                },
                {
                    "type": "null"
                }
            ]
        }
    }
},
{
    "properties": {
        "identity": {
            "description": "1 if config is consistent between members of RG, 2 if it is inconsistent and 3 if it is unknown - meaning no config check is supported or configured",
            "enum": [
                "config_sanity"
            ],
            "type": "string"
        },
        "value": {
            "oneOf": [
                {
                    "enum": [
                        "1",
                        "2",
                        "3"
                    ],
                    "type": "string"
                },
                {
                    "type": "null"
                }
            ]
        }
    }
},
"required": [
    "identity",
    "value"
],
"type": "object"
}
```

FIG. 7A
(Cont)

vlan

```
{
    "properties": {
        "identity": {
            "pattern": "^[1-9][0-9]*$",
            "type": "string"
        },
        "value": {
            "properties": {
                "interfaces": {
                    "items": {
                        "type": "string"
                    },
                    "type": "array"
                },
                "name": {
                    "type": "string"
                },
                "vlan_id": {
                    "type": "integer"
                }
            },
            "required": [
                "vlan_id",
                "name",
                "interfaces"
            ],
            "type": "object"
        }
    },
    "required": [
        "identity",
        "value"
    ],
    "type": "object"
}
```

**FIG. 7A
(Cont)**

vrf

```json
{
    "properties": {
        "identity": {
            "type": "string"
        },
        "value": {
            "properties": {
                "interfaces": {
                    "description": "interfaces in this vrf",
                    "items": {
                        "type": "string"
                    },
                    "type": "array"
                },
                "multicast_mode": {
                    "description": "multicast enabled/disabled on vrf",
                    "enum": [
                        "enabled",
                        "disabled"
                    ],
                    "type": "string"
                },
                "rd": {
                    "description": "route descriptor",
                    "oneOf": [
                        {
                            "type": "string"
                        },
                        {
                            "type": "null"
                        }
                    ]
                },
                "role": {
                    "description": "Indicates the role of this VRF, in terms of traffic it carries",
                    "enum": [
                        "data",
                        "management"
                    ],
                    "type": "string"
                }
            },
            "required": [
                "multicast_mode",
                "role",
                "interfaces"
            ],
            "type": "object"
        }
    },
    "required": [
        "identity",
        "value"
    ],
    "type": "object"
}
```

FIG. 7A
(Cont)

multicast_info

```
{
    "definitions": {
        "ipAddressArray": {
            "items": {
                "format": "ipv4",
                "type": "string"
            },
            "type": "array"
        }
    },
    "properties": {
        "identity": {
            "type": "string"
        },
        "value": {
            "properties": {
                "sparse_mode": {
                    "properties": {
                        "anycast_peers": {
                            "$ref": "#/definitions/ipAddressArray",
                            "description": "Anycast RP peer IPs configured on current switch"
                        },
                        "anycast_rps": {
                            "$ref": "#/definitions/ipAddressArray",
                            "description": "Anycast RP IPs if current switch is configured as an RP"
                        },
                        "groups": {
                            "description": "Group CIDR mapping to group info",
                            "patternProperties": {
                                "(([0|[1-9][0-9]?]|(1[0-9]{2})|(2[0-4][0-9])|(25[0-5]))\\.){3}([0|[1-9][0-9]?]|(1[0-9]{2})|(2[0-4][0-9])|(25[0-5]))[-9]|([1-2][0-9])|(3[0-2])": {
                                    "properties": {
                                        "mode": {
                                            "description": "PIM forwarding mode",
                                            "oneOf": [
                                                {
                                                    "enum": [
                                                        "pim-sparse",
                                                        "disabled",
                                                        "pim-dense"
                                                    ],
                                                    "type": "string"
                                                },
                                                {
                                                    "type": "null"
                                                }
                                            ]
                                        },
                                        "rps": {
                                            "patternProperties": {
```

FIG. 7A
(Cont)

```
"(0|([1-9][0-9]?|1[0-9]{2}|2([0-4][0-9]|5[0-5]))\.){3}(0|([1-9][0-9]?|1[0
-9]{2}|2([0-4][0-9]|5[0-5]))":  {
                                                    "description": "BP IP for
enclosing group",
                                                    "properties": {
                                                        "discovery_mode": {
                                                            "description": "BP
discovery mechanism",
                                                            "oneOf": [
                                                                {
                                                                    "enum": [
                                                                        "static",
                                                                        "auto-rp",
                                                                        "bsr"
                                                                    ],
                                                                    "type": "string"
                                                                },
                                                                {
                                                                    "type": "null"
                                                                }
                                                            ]
                                                        }
                                                    },
                                                    "required": [
                                                        "discovery_mode"
                                                    ],
                                                    "type": "object"
                                                }
                                            },
                                            "type": "object"
                                        }
                                    },
                                    "required": [
                                        "mode",
                                        "rps"
                                    ],
                                    "type": "object"
                                }
                            },
                            "type": "object"
                        }
                    },
                    "required": [
                        "groups",
                        "anycast_rps",
                        "anycast_peers"
                    ],
                    "type": "object"
                }
            },
            "required": [
                "sparse_mode"
            ],
            "type": "object"
        }
    },
    "required": [
        "identity",
        "value"
    ],
    "type": "object"
}
```

FIG. 7A
(Cont)

hostname

{"domain":"","hostname":"leaf2-rack1","version":1} lldp_details

```
{
    "Ethernet2": {
        "interface_name": "Ethernet1",
        "hostname": "spine-2",
        "chassis_id": "5254.00ad.63ba",
        "src_interface_name": "Ethernet2",
        "sys_description": "Arista Networks EOS version 4.19.4F running on an Arista
Networks vEOS"
    },
    "Ethernet3": {
        "interface_name": "Ethernet3",
        "hostname": "leaf-1-2",
        "chassis_id": "5254.002c.98e9",
        "src_interface_name": "Ethernet3",
        "sys_description": "Arista Networks EOS version 4.19.4F running on an Arista
Networks vEOS"
    },
    "Ethernet1": {
        "interface_name": "Ethernet1",
        "hostname": "spine-1",
        "chassis_id": "5254.0082.bab9",
        "src_interface_name": "Ethernet1",
        "sys_description": "Arista Networks EOS version 4.19.4F running on an Arista
Networks vEOS"
    },
    "Ethernet4": {
        "interface_name": "eth1",
        "hostname": "localhost",
        "chassis_id": "5254.004b.bc18",
        "src_interface_name": "Ethernet4",
        "sys_description": "Ubuntu 16.04.4 LTS Linux 4.4.0-116-generic #140-Ubuntu
SMP Mon Feb 12 21:23:04 UTC 2018 x86_64"
    }
}
```

FIG. 7B bgp

```
{
    "default_172.16.0.6": {
        "value": "up",
        "dest_ip": "172.16.0.6",
        "vrf": "default",
        "source_asn": 1,
        "dest_asn": 4
    },
    "default_172.16.0.8": {
        "value": "up",
        "dest_ip": "172.16.0.8",
        "vrf": "default",
        "source_asn": 1,
        "dest_asn": 2
    },
    "default_172.16.0.12": {
        "value": "up",
        "dest_ip": "172.16.0.12",
        "vrf": "default",
        "source_asn": 1,
        "dest_asn": 3
    }
}
``` interface_details

```
{
    "Vlan12": {
        "native_vlan": null,
        "speed_mbps": 10000,
        "parent": null,
        "description": "",
        "mlag_id": null,
        "name": "Vlan12",
        "virtual_macs": [
            "00:1c:73:00:00:01"
        ],
        "ipv4_addr": "172.16.5.3/24",
```

FIG. 7B
(Cont)

```
      "mode": "trunk",
      "subinterface_id": null,
      "type": "svi",
      "allowed_vlans": [],
      "vlan_id": 15,
      "virtual_ips": [
        "172.16.5.1"
      ]
    },
    "Vlan10": {
      "native_vlan": null,
      "speed_mbps": 10000,
      "parent": null,
      "description": "",
      "mlag_id": null,
      "name": "Vlan10",
      "virtual_macs": [
        "00:1c:73:00:00:01"
      ],
      "ipv4_addr": "172.16.1.2/24",
      "mode": "trunk",
      "subinterface_id": null,
      "type": "svi",
      "allowed_vlans": [],
      "vlan_id": 10,
      "virtual_ips": [
        "172.16.1.1"
      ]
    },
    "Vlan11": {
      "native_vlan": null,
      "speed_mbps": 10000,
      "parent": null,
      "description": "",
      "mlag_id": null,
      "name": "Vlan11",
      "virtual_macs": [
        "00:1c:73:00:00:01"
      ],
      "ipv4_addr": "172.16.3.2/24",
      "mode": "trunk",
      "subinterface_id": null,
      "type": "svi",
      "allowed_vlans": [],
      "vlan_id": 11,
      "virtual_ips": [
        "172.16.3.1"
      ]
    },
    "Ethernet3": {
      "native_vlan": null,
      "speed_mbps": 10000,
      "parent": null,
      "description": "facing_spine2(Ethernet1)",
      "mlag_id": null,
      "name": "Ethernet3",
      "virtual_macs": [
        "00:1c:73:00:00:01"
      ],
      "ipv4_addr": "172.16.0.13/31",
```

FIG. 7B
(Cont)

```
      "mode": "trunk",
      "subinterface_id": null,
      "type": "ip",
      "allowed_vlans": [],
      "vlan_id": null,
      "virtual_ips": []
    },
    "Ethernet3": {
      "native_vlan": 1,
      "speed_mbps": 10000,
      "parent": "port-channel2",
      "description": "facing_rack-1-leaf2:Ethernet3",
      "mlag_id": null,
      "name": "Ethernet3",
      "virtual_macs": [
        "00:1c:73:00:00:01"
      ],
      "ipv4_addr": null,
      "mode": "trunk",
      "subinterface_id": null,
      "type": "ethernet",
      "allowed_vlans": [],
      "vlan_id": null,
      "virtual_ips": []
    },
    "port-channel2": {
      "native_vlan": 1,
      "speed_mbps": 10000,
      "parent": null,
      "description": "facing_rack-1-leaf2",
      "mlag_id": null,
      "name": "port-channel2",
      "virtual_macs": [
        "00:1c:73:00:00:01"
      ],
      "ipv4_addr": null,
      "mode": "trunk",
      "subinterface_id": null,
      "type": "port_channel",
      "allowed_vlans": [
        1,
        10,
        11,
        12,
        3999
      ],
      "vlan_id": null,
      "virtual_ips": []
    },
    "Ethernet1": {
      "native_vlan": null,
      "speed_mbps": 10000,
      "parent": null,
      "description": "facing_spine1:Ethernet1",
      "mlag_id": null,
      "name": "Ethernet1",
      "virtual_macs": [
        "00:1c:73:00:00:01"
      ],
      "ipv4_addr": "172.16.0.7/31",
```

FIG. 7B
(Cont)

```
      "mode": "trunk",
      "subinterface_id": null,
      "type": "ip",
      "allowed_vlans": [],
      "vlan_id": null,
      "virtual_ips": []
    },
    "Ethernet6": {
      "native_vlan": null,
      "speed_mbps": 10000,
      "parent": null,
      "description": "",
      "mlag_id": null,
      "name": "Ethernet6",
      "virtual_macs": [
        "00:1c:73:00:00:01"
      ],
      "ipv4_addr": null,
      "mode": "trunk",
      "subinterface_id": null,
      "type": "ethernet",
      "allowed_vlans": [],
      "vlan_id": null,
      "virtual_ips": []
    },
    "Ethernet7": {
      "native_vlan": null,
      "speed_mbps": 10000,
      "parent": null,
      "description": "",
      "mlag_id": null,
      "name": "Ethernet7",
      "virtual_macs": [
        "00:1c:73:00:00:01"
      ],
      "ipv4_addr": null,
      "mode": "trunk",
      "subinterface_id": null,
      "type": "ethernet",
      "allowed_vlans": [],
      "vlan_id": null,
      "virtual_ips": []
    },
    "Ethernet4": {
      "native_vlan": 10,
      "speed_mbps": 10000,
      "parent": "port-channel1",
      "description": "to.rack-1-server1",
      "mlag_id": null,
      "name": "Ethernet4",
      "virtual_macs": [
        "00:1c:73:00:00:01"
      ],
      "ipv4_addr": null,
      "mode": "trunk",
      "subinterface_id": null,
      "type": "ethernet",
      "allowed_vlans": [],
      "vlan_id": null,
      "virtual_ips": []
```

FIG. 7B
(Cont)

```
},
"Ethernet8": {
  "native_vlan": null,
  "speed_mbps": 10000,
  "parent": null,
  "description": "",
  "mlag_id": null,
  "name": "Ethernet8",
  "virtual_macs": [
    "00:1c:73:00:00:01"
  ],
  "ipv4_addr": null,
  "mode": "trunk",
  "subinterface_id": null,
  "type": "ethernet",
  "allowed_vlans": [],
  "vlan_id": null,
  "virtual_ips": []
},
"Loopback0": {
  "native_vlan": null,
  "speed_mbps": 10000,
  "parent": null,
  "description": "",
  "mlag_id": null,
  "name": "Loopback0",
  "virtual_macs": [
    "00:1c:73:00:00:01"
  ],
  "ipv4_addr": "172.16.0.0/32",
  "mode": "trunk",
  "subinterface_id": null,
  "type": "loopback",
  "allowed_vlans": [],
  "vlan_id": null,
  "virtual_ips": []
},
"Vlan3999": {
  "native_vlan": null,
  "speed_mbps": 10000,
  "parent": null,
  "description": "MCLAG",
  "mlag_id": null,
  "name": "Vlan3999",
  "virtual_macs": [
    "00:1c:73:00:00:01"
  ],
  "ipv4_addr": "172.16.0.4/31",
  "mode": "trunk",
  "subinterface_id": null,
  "type": "svi",
  "allowed_vlans": [],
  "vlan_id": 3999,
  "virtual_ips": []
},
"port-channel1": {
  "native_vlan": 10,
  "speed_mbps": 10000,
  "parent": null,
  "description": "to.rack-1-server1",
```

FIG. 7B
(Cont)

```
    "mlag_id": "1",
    "name": "port-channel1",
    "virtual_macs": [
      "00:1c:73:00:00:01"
    ],
    "ipv4_addr": null,
    "mode": "trunk",
    "subinterface_id": null,
    "type": "port_channel",
    "allowed_vlans": [
      10,
      11,
      12
    ],
    "vlan_id": null,
    "virtual_ips": []
  }
}
``` mlag_domain

```
{
    "local_interface_status": 1,
    "peer_link_status": 1,
    "local_interface": "Vlan3999",
    "peer_link": "port-channel3",
    "domain_state": 1,
    "system_id": "52:54:00:2c:98:e9",
    "config_sanity": 1,
    "peer_address": "172.16.0.3",
    "domain_id": "1",
    "local_interface_vlan_id": 3999
}
```

FIG. 7B
(Cont)

vlan

```
{
    "1": {
        "interfaces": [
            "port-channel3"
        ],
        "name": "default",
        "vlan_id": 1
    },
    "10": {
        "interfaces": [
            "port-channel1",
            "port-channel2"
        ],
        "name": "vnet_10_on_rack_1_leaf_pair",
        "vlan_id": 10
    },
    "11": {
        "interfaces": [
            "port-channel1",
            "port-channel2"
        ],
        "name": "vnet_11_on_rack_1_leaf_pair",
        "vlan_id": 11
    },
    "12": {
        "interfaces": [
            "port-channel1",
            "port-channel2"
        ],
        "name": "vnet_12_on_rack_1_leaf_pair",
        "vlan_id": 12
    },
    "2999": {
        "interfaces": [
            "port-channel3"
        ],
        "name": "MCLAG",
        "vlan_id": 2999
    }
}
```

FIG. 7B
(Cont)

vrf

```json
{
    "CSCO-VRF": {
        "rd": "1:563",
        "multicast_mode": "disabled",
        "role": "data",
        "interfaces": [
            "Ethernet49/1.563",
            "Ethernet50/1.563",
            "Ethernet51/1.563",
            "Loopback563",
            "Vlan563",
            "Vlan601"
        ]
    },
    "management": {
        "rd": "1:1",
        "multicast_mode": "disabled",
        "role": "management",
        "interfaces": [
            "Management1"
        ]
    },
    "default": {
        "rd": "",
        "multicast_mode": "enabled",
        "role": "data",
        "interfaces": []
    },
    "ISCS-VRF": {
        "rd": "1:566",
        "multicast_mode": "disabled",
        "role": "data",
        "interfaces": [
            "Ethernet49/1.566",
            "Ethernet50/1.566",
            "Ethernet51/1.566",
            "Loopback566",
            "Vlan566",
            "Vlan602"
        ]
    }
}
```

FIG. 7B
(Cont)

multicast_info

```
{
    "CRED-VRF": {
        "sparse_mode": {
            "anycast_rps": {},
            "anycast_peers": {},
            "groups": {
                "224.0.0.0/4": {
                    "rps": {
                        "10.13.1.100": {
                            "discovery_mode": "static"
                        }
                    },
                    "mode": "pim-sparse"
                }
            }
        }
    },
    "default": {
        "sparse_mode": {
            "anycast_rps": {},
            "anycast_peers": {},
            "groups": {
                "224.0.0.0/4": {
                    "rps": {
                        "10.10.1.100": {
                            "discovery_mode": "static"
                        }
                    },
                    "mode": "pim-sparse"
                }
            }
        }
    },
    "iscs-vrf": {
        "sparse_mode": {
            "anycast_rps": {},
            "anycast_peers": {},
            "groups": {
                "224.0.0.0/4": {
                    "rps": {
                        "10.13.1.100": {
                            "discovery_mode": "static"
                        }
                    },
                    "mode": "pim-sparse"
                }
            }
        }
    }
}
```

FIG. 7B
(Cont)

```
node(type="switch")                    — 960
.out("hostedinterfaces")               — 962
.node("interface")                     — 964
.out("link")
.node("link")
.out("interfaces")
.node("interface")
.out("hosted_on")
.node("switch")
```

FIG. 9C

```
node(type="switch", label = "local_device")  — 980
.out("hostedinterfaces")
.node("interface")
.out("link")
.node("link")
.out("interfaces")
.node("interface")
.out("hosted_on")
.node("switch")
```

FIG. 9D

```
class Schema(schema.Schema):
    nodes = {
        'system': {
            'system_type': schema.Enum(['switch', 'server']),
            'role': schema.Enum(['spine', 'leaf',
                        'l2_server', 'l3_server',
                        'external_router']),
            'hostname': schema.Optional(schema.String()),
            'system_id': schema.Optional(schema.String()),
            'deploy_mode': schema.Optional(schema.Enum(['deploy', 'undeploy',
                                    'ready'])),
            'position': schema.Optional(schema.Integer()),
            'logical_device': schema.Optional(schema.String()),
        },
        'redundancy_group': {
        },
        'link': {
            'link_type': schema.Enum(['ethernet', 'aggregate_link']),
            'role': schema.Enum(['spine_leaf', 'leaf_l2_server', 'leaf_l3_server',
                        'leaf_pair_l2_server', 'leaf_pair_l3_server',
                        'leaf_peer_link', 'to_external_router']),
        },
        'interface': {
            'if_type': schema.Enum(['ip', 'loopback', 'ethernet', 'vlan', 'svi',
                        'port_channel', 'mlag_port_channel']),
            'if_name': schema.Optional(schema.String()),
            'mode': schema.Optional(schema.Enum(['trunk', 'access'])),
            'ipv4_addr': schema.Optional(schema.IpAddress()),
            'port_channel_id': schema.Optional(schema.Integer()),
            'mlag_id': schema.Optional(schema.Integer()),
            'protocols': schema.Optional(schema.Enum(['ebgp', 'ospf'])),
        },
        'domain': {
            'domain_type': schema.Enum(['autonomous_system', 'area', 'mlag']),
        },
        'virtual_network': {
            'vn_type': schema.Enum(['vlan', 'vxlan']),
            'vn_id': schema.Integer(),
            'description': schema.Optional(schema.String()),
            'ipv4_subnet': schema.Optional(schema.IpNetworkAddress()),
            'virtual_mac': schema.Optional(schema.MacAddress()),
            'virtual_gateway_ipv4': schema.Optional(schema.IpAddress()),
        },
```

```
'vn_instance': {
    'vlan_id': schema.VlanId(),
},
'vn_endpoint': {
    'tag_type': schema.Enum(['vlan_tagged', 'untagged']),
},
} relationships = [
    {
        'source': 'link',
        'type': 'composed_of',
        'target': 'link',
    },
    {
        'source': 'link',
        'type': 'part_of',
        'target': 'link',
    },
    {
        'source': 'system',
        'type': 'hosted_interfaces',
        'target': 'interface',
    },
    {
        'source': 'interface',
        'type': 'hosted_on',
        'target': 'system',
    },
    {
        'source': 'interface',
        'type': 'composed_of',
        'target': 'interface',
    },
    {
        'source': 'interface',
        'type': 'part_of',
        'target': 'interface',
    },
    {
        'source': 'interface',
        'type': 'link',
        'target': 'link',
    },
```

```
{
  'source': 'link',
  'type': 'interfaces',
  'target': 'interface',
},
{
  'source': 'domain',
  'type': 'composed_of_systems',
  'target': 'system',
},
{
  'source': 'system',
  'type': 'part_of_domain',
  'target': 'domain',
},
{
  'source': 'domain',
  'type': 'composed_of_redundancy_group',
  'target': 'redundancy_group',
},
{
  'source': 'redundancy_group',
  'type': 'redundancy_group_domain',
  'target': 'domain',
},
{
  'source': 'domain',
  'type': 'composed_of_interfaces',
  'target': 'interface',
},
{
  'source': 'interface',
  'type': 'part_of_domain',
  'target': 'domain',
},
{
  'source': 'system',
  'type': 'part_of_redundancy_group',
  'target': 'redundancy_group',
},
{
  'source': 'redundancy_group',
  'type': 'composed_of_systems',
  'target': 'system',
},
```

```
{
  'source': 'interface',
  'type': 'hosted_on',
  'target': 'redundancy_group',
},
{
  'source': 'redundancy_group',
  'type': 'hosted_interfaces',
  'target': 'interface',
},
{
  'source': 'virtual_network',
  'type': 'instantiated_by',
  'target': 'vn_instance',
},
{
  'source': 'vn_instance',
  'type': 'instantiates',
  'target': 'virtual_network',
},
{
  'source': 'virtual_network',
  'type': 'member_endpoints',
  'target': 'vn_endpoint',
},
{
  'source': 'vn_endpoint',
  'type': 'member_of',
  'target': 'virtual_network',
},
{
  'source': 'system',
  'type': 'hosted_vn_endpoint',
  'target': 'vn_endpoint',
},
```
⎬ 1024

AUTOMATICALLY GENERATING AN INTENT-BASED NETWORK MODEL OF AN EXISTING COMPUTER NETWORK

CROSS REFERENCE

This application is a continuation of U.S. patent application Ser. No. 16/360,660, filed 21 Mar. 2019, the entire contents of which is incorporated herein by reference.

BACKGROUND OF THE INVENTION

Ensuring that a computer network is operating correctly and efficiently typically requires managing and monitoring the computer network and addressing and solving problems associated with the computing network as they arise. Due to the increasing size and complexity of modern computer networks, manually monitoring and updating computer networks is not feasible. Typically, monitoring complex computer networks involves the use of sophisticated software management tools. Often legacy networks are not able to be used with modern network management tools that provide improved solutions because critical information about these legacy networks are unknown or not in a format understood by these tools.

BRIEF DESCRIPTION OF THE DRAWINGS

Various embodiments of the invention are disclosed in the following detailed description and the accompanying drawings.

FIG. 7A shows examples of unpopulated telemetry service schemas.

FIG. 7B shows examples of populated telemetry service schemas.

FIGS. 9C and 9D are examples of triggering patterns.

DETAILED DESCRIPTION

Figure 1:
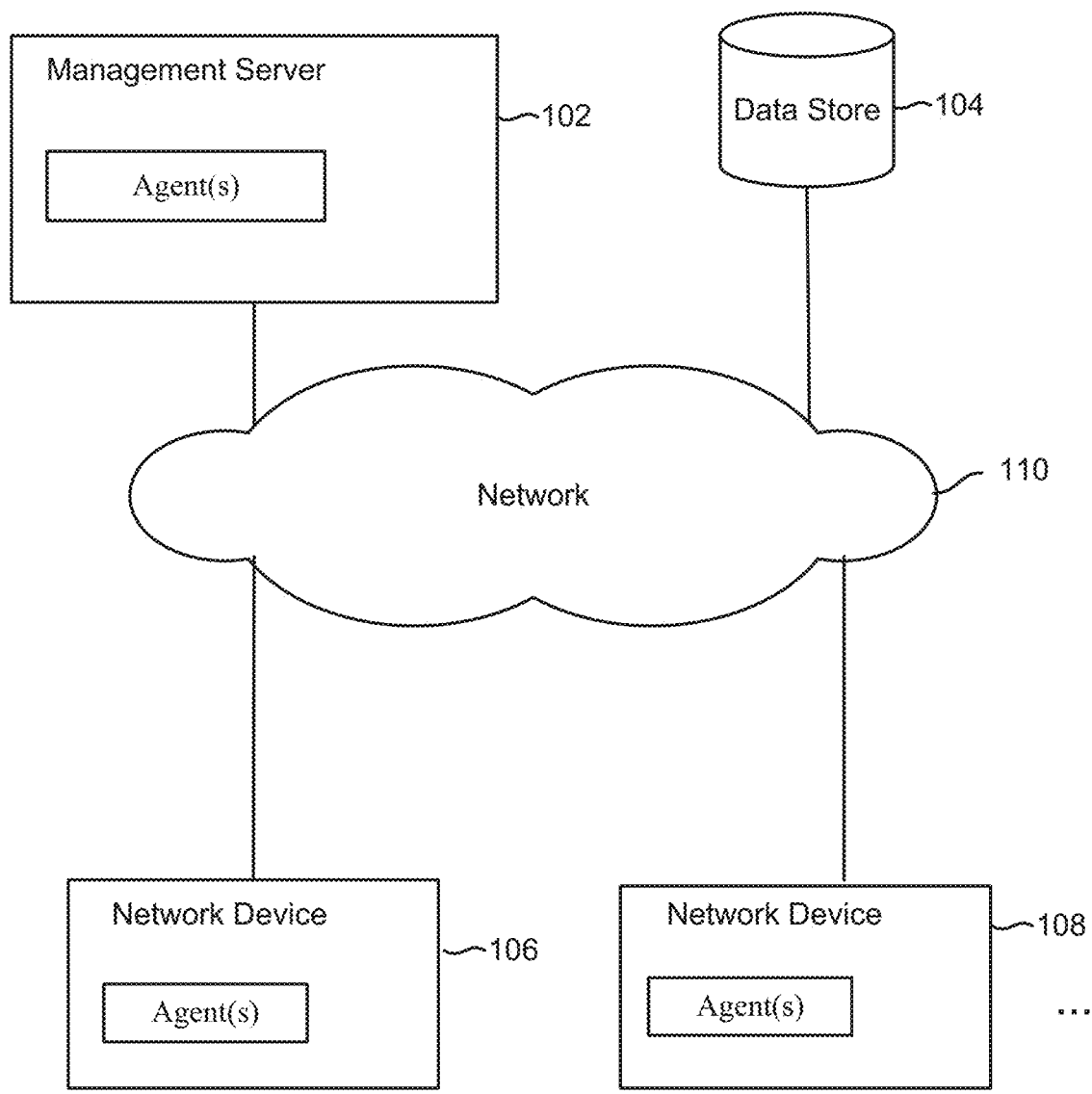
FIG. 1 is a diagram illustrating an embodiment of a network management environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Computer networks, which may also be referred to herein as computing networks, networks, computing infrastructure, infrastructure, etc., (e.g., those associated with enterprise data center infrastructures) are becoming increasingly complex and the need for tools to efficiently manage computer networks is of paramount importance. Intent based networking (IBN) has been recognized by many as an effective way to comprehensively manage computing infrastructure. IBN solutions typically involve provisioning a computer network with a set of IBN tools (e.g., management server 102 of FIG. 1) and subsequently managing the full life cycle of the computer network using the same IBN tools. This is a sensible approach for new computing infrastructure, also known as greenfield networks. However, most organizations utilizing computer networks have existing computer networks (also known as brownfield networks) that have not been provisioned using IBN tools. Many organizations are hesitant to use IBN tools as they do not want to use different tools for new and existing infrastructures (greenfield and brownfield networks). It is usually not feasible to tear down existing infrastructure and rebuild using IBN tools because existing computer networks may be critical to operations. Thus, a way to migrate existing computer networks (brownfield networks) so that they can be managed by IBN tools is needed.

Generating an intent-based network model of an existing computer network, which allows for the existing computer network to be able to be managed by IBN tools, is disclosed. The disclosed method comprises providing collectors to network devices of the existing computer network, determining a reference network type associated with the existing computer network, generating an intent-based network model of the existing computer network based at least in part on telemetry and configuration information received from the collectors and the reference network type, and validating the existing computer network using the generated intent-based network model. A system comprising a processor configured to execute the method and a memory configured to provide the processor with instructions is also disclosed. A practical and technological benefit of the invention disclosed herein is allowing the same computer network management tools to be used for both new and existing computing infrastructure, thereby allowing for more efficient allocation and utilization of resources associated with managing computer networks. Adoption of brownfield networks into an IBN framework would allow the brownfield networks to be monitored by IBN tools. Furthermore, monitoring of brownfield networks with IBN tools could be extended to full intent-based lifecycle management of the brownfield networks. Thus, this would lead to a single IBN-based tool (or set of IBN-based tools) for all types of infrastructure (e.g., including both greenfield networks and brownfield networks).

In various embodiments, an intent-based network model of an existing computer network is a model that reveals and/or rebuilds intent (e.g., specified declarative intent, declarative requirements, declarative specifications, declarative network requirements, desired network requirements, declarative input requirements, declarative instructions, etc.) with which the existing computer network would have been designed, built, and/or deployed had it been designed, built, and/or deployed with MN tools (e.g., intent used to design, build, and/or deploy a greenfield network). In various embodiments, the intent is revealed and/or rebuilt by reverse engineering the intent from data collected by collectors installed onto network devices of the existing computer network. In some embodiments, the collectors are agents or part of agents (e.g., software agents) installed onto network devices from a management server. The collectors may be configured to gather various telemetry and configuration data used to reverse engineer intent. Examples of collected data include information associated with device operational status, connectivity between devices, hostnames, link layer discovery protocol (LLDP) details, border gateway protocol (BGP) details, interfaces, multi-chassis link aggregation (MLAG), virtual local area network (VLAN) details, virtual routing and forwarding (VRF), and multicast details.

In various embodiments, a reference network type associated with the existing network is determined. Examples of reference network types include L3 Clos (leaf-spine) designs, other Layer 3 designs, Layer 2 designs, traditional core-aggregation-access designs, etc. In some embodiments, the reference network type is received as an input (e.g., via a user interface). Other information that may be received as inputs include network fabric properties (e.g., symmetry), seed spines (for leaf-spine designs), external router connections (for designs that connect to the Internet), Internet Protocol (IP) subnet properties, links between leafs in leaf-spine designs, rack design properties (e.g., dual-leaf versus single-leaf), server properties (e.g., dual-attached versus single-attached), high availability specifications, oversubscription ratios, etc. In various embodiments, inputted information that is received is associated with network intent. This information may affect data collection by collectors and provide constraints during network validation (e.g., enforce symmetry if symmetry properties are specified).

In some embodiments, the intent-based network model of the existing computer network that is generated (e.g., based on data collected by collectors and any received information/constraints) is a graph representation (which may also be referred to herein as a graph model, model, graph, graph representation data model, network configuration graph, etc.). The graph representation may include computing network elements such as nodes and edges. Examples of data associated with each node of the graph representation include: an identifier, a node type (e.g., server, switch, interface, rule, policy, etc.), a descriptive label (e.g., description of node), a tag, and other properties (e.g., one or more key value pairs). Examples of data associated with each edge of the graph model include: an identifier, an edge type (e.g., hosted interfaces, hosted on, etc.), a source node connected by an edge, a target node connected by an edge, a descriptive label (e.g., description of edge), a tag, and other properties (e.g., one or more key value pairs).

In various embodiments, the generated intent-based network model of the existing computer network is validated. In some embodiments, a blueprint of the generated intent-based network model is created. The blueprint may include a visual representation of a graph representation of the generated intent-based network model and telemetry and configuration data from collectors. The blueprint may include a list of devices, their connections, their roles, roles of ports, IP addresses, virtual networks, autonomous system numbers (ASNs), etc. The blueprint may be provided to a user to approve and to confirm that the generated intent-based model accurately reflects an underlying intent for the existing computer network (e.g., via a graphical user interface). In some embodiments, additional input may be received from the user and/or more telemetry and configuration data collected to generate a modified intent-based network model that better conforms to the underlying intent for the existing computer network (e.g., when information that is needed to complete validation is missing). In various embodiments, various tests are performed to validate the generated intent-based network model against constraints (e.g., constraints that follow from the reference network type and/or other received constraints). For example, for an L3 Clos network design, if a symmetric network fabric is specified, then if any leaf has a different uplink bandwidth relative to other leafs, an error may be flagged.

In various embodiments, after the generated intent-based network model of the existing computer network is validated, the existing computer network is managed (e.g., using IBN tools). Thus, after generation of intent-based network models, the same tools that are associated with greenfield networks can be used with brownfield networks. IBN tools may be given control of the existing network, including for making any changes to the existing network (e.g., see FIGS. 12-14). In some embodiments, when a change in the graph representation of the existing network matches a specified triggering graph representation pattern of a corresponding agent (e.g., an agent installed onto a network device), the agent performs processing required to generate configurations and deploy computing infrastructure in response to the change (e.g., through use of callback functions, as described in further detail herein). Agents may also monitor the existing network for anomalies (e.g., see FIG. 15).

FIG. 1 is a diagram illustrating an embodiment of a network management environment. Management server 102 is connected to data store 104, network device 106, and network device 108 via network 110. In some embodiments, management server provides MN tools. In some embodiments, management server 102 provides a network configuration, monitoring, and management solutions. For example, a user may utilize a solution at least in part provided by management server 102 to set up a network configuration, set up a network device, calculate operational state expectations, monitor performance or operational state of a network, monitor devices of a network, automate tasks, and otherwise perform management of devices of the network. In the example shown, management server 102 is utilized to manage at least network device 106 and network device 108. Management server 102 processes/executes agents (e.g., agents performing functions triggered when a portion of a graph representation matches a specified triggering graph representation pattern of a corresponding agent). In some embodiments, management server 102 is specialized custom hardware. In some embodiments, management server 102 is utilized to configure hardware network switches.

In some embodiments, management server 102 facilitates interactions with users to receive and provide desired requirements, specifications, and status updates. For example, a user utilizes a user interface (e.g., web interface, application interface, command line interface, graphical interface, application programming interface (API), configuration file interface, etc.) provided directly and/or remotely (e.g., via display, wired connection, network, etc.). Using the user interface, a user may provide high level requirements that specify a desired configuration of a desired network/device and/or receive information regarding status of devices/components of the desired network and/or an implementation status regarding the desired configuration requirements.

In some embodiments, management server 102 selects processing agents among a plurality of processing agents (e.g., triggered by patterns matching at least a portion of a graph representation) to achieve/complete a desired network requirement. In some embodiments, agents are accessed by a user via an API (e.g., RESTful API). For example, HTTP methods (e.g., GET, PUT, POST, DELETE, etc.) may be utilized to access and manage information via the API. URIs may be utilized to reference state and resources. The declarative requirements may be specified at one or more selected stages/levels among a plurality of stages/levels. In some embodiments, a user specifies one or more constraints (e.g., resources, policies, etc.) of a desired network configuration.

In some embodiments, at least a portion of a computing infrastructure to implement the declarative requirements is represented as a graph model/representation of computing infrastructure elements including computing infrastructure nodes and computing infrastructure edges. Examples of data associated with each node of the graph representation include: an identifier, a node type (e.g., server, switch, interface, rule, policy, etc.), a descriptive label (e.g., description of node), a tag, and other properties (e.g., one or more key value pairs). Examples of data associated with each edge of the graph representation include: an identifier, an edge type (e.g., hosted interfaces, hosted on, etc.), a source node connected by an edge, a target node connected by an edge, a descriptive label (e.g., description of edge), a tag, and other properties (e.g., one or more key value pairs).

When a change in the graph representation of computing infrastructure elements is detected, it is determined whether the change affects any triggering graph representation pattern. In the event the change affects the triggering pattern, the change is notified to a processing agent associated with the affected triggering pattern. For example, processing agents may be declaratively authored with a set of one or more triggering patterns with associated callback functions. The function of each agent may perform portions of the processing required to generate configurations and deploy the computing infrastructure. For example, the callback functions of various agents may perform semantic validation, gather telemetry and execution data, and/or detect anomalies during execution. In various embodiments, callback functions include code to be executed. This paradigm may support any programming language to be used for authoring callback functions.

In various embodiments, the system invokes the callback of an agent anytime the graph representation elements' corresponding triggering pattern of the agent is 'added,' 'updated,' and/or 'removed' in the associated portion of the graph representation. Thus, each agent can deal with a subset of a graph model/representation that is relevant to its own objectives and would not get invoked for changes not relevant to it. In various embodiments, each processing agent focuses only on the parts of the graph representation relevant to the business logic it implements. Agents need not keep track of all changes to the graph and would only need to re-execute parts of its business logic based on incremental changes in the graph representation portion of interest. By having all processing related to the computing infrastructure implemented as agents of the graph model, the computing infrastructure can be optimized and scaled independently of any complex central processing given the decentralization of the processing agents.

The agents thus coded in the above fashion can incrementally perform their duties. In some embodiments, on startup, agent(s) evaluate their inputs and outputs and perform initial processing to ensure that inputs and outputs satisfy constraints defined in their business logic. This initial processing may involve processing multiple components of the graph representation matching the agent(s)' defined triggering patterns. After initial start-up processing, the agent(s) have reached a steady state. In the steady state, the agent(s) may choose to only react to incremental changes to the graph representation that are relevant to their business logic and perform incremental processing on such changes on top of the steady state.

In some embodiments, a triggering pattern of a processing agent specifies identifiers of graph representation elements that describe at least a portion of a graph representation of interest, and when the triggering pattern matches a portion of the graph representation of interest or no longer matches a previously matched portion of the graph representation, the associated processing function is executed. The invoked function of the agent may be provided pointers to the graph representation elements included in the matching portion to allow the invoked function to utilize/modify the associated graph representation elements. In some embodiments, an API is provided to allow modification and use of the graph representation via the API. Execution of the API invokes one or more associated agents to perform the necessary processing required to achieve the desired result of the API invocation. In some embodiments, telemetry data collected during use and execution of the computing infrastructure is mapped to corresponding graph representation elements to provide (e.g., visually) a representation of the telemetry data in the graph representation format.

This paradigm may support any programming language to be used for authoring agents. Code execution is efficient because each piece of code can be explicitly associated with only a portion of the graph representation of interest (e.g., small portion) and is only invoked when necessary. The agents are also modular because each agent can have any number of rules, each with a callback function, thereby cleanly separating the code along the boundaries of triggering patterns. It is also scalable because there can be multiple agent instances and multiple systems to dispatch changes to interested agents. This enables a real-time state (e.g., not message) based publish/subscribe communication mechanism implemented on top of graph-based live queries, therefore enabling reacting to incremental graph changes and triggering incremental processing. The asynchronous, reactive capability of the system allows the system to scale. Support for new features offered by modern infrastructure platforms may be easily added (e.g. by adding new agents). In some embodiments, components of the system communicate in reaction to a change in intent.

Management server 102 implements and manages various graph representation processing agents. In some embodiments, agents provide device requirement instructions to and receive status information from various devices of a network being managed. For example, using desired network requirements, agents may determine individual device requirements to implement the desired network requirements. In some embodiments, in translating the desired network requirements to the device requirements, a plurality of different successive processing stages/levels may be utilized. The network requirements may be specified for any of the different processing stage levels. For example, network requirements may be specified at the most general and highest level and/or at a lower and more specific stage/level. Each processing stage/level may translate an input declarative requirement to an output declarative requirement that may be utilized as the input declarative requirement for the next subsequent lower processing stage/level. For each processing stage/level, agents may merge an input declarative requirement with one or more constraints (e.g., resources available, policies to follow, etc.) to determine the output declarative requirement. By being able to provide desired declarative network requirements of any selected stage/level of a plurality of different processing stages/levels, a user is given the option to tune the level/amount of control desired by the user in configuring the network. For example, a network administrator who desires to quickly set up a default configuration network may specify declarative requirements at the highest stage/level while a network administrator who desires to set up a more customized and specific network may specify declarative requirements at a lower stage/level. In some embodiments, each processing stage/level performs a different function. For example, one processing stage/level may determine a logical connectivity in its output declarative requirements, another processing stage/level may determine physical connectivity in its output declarative requirements, and another processing stage/level may determine a cabling diagram in its output declarative requirements.

In various embodiments, any number of agents may exist. Each agent may perform the same and/or different functions that may be triggered by one or more associated triggering patterns. In some embodiments, agent(s) coordinate and perform verification that a service is functioning. For example, the desired configuration of a desired network/device service that has been received may be utilized to generate one or more device verification models for one or more devices that are utilized. Each device verification model may identify one or more parameters to be verified/detected for the specific device of the verification model. The device verification model is different from device requirements provided to a device to implement the device requirements to configure the device. For example, device requirements are provided to configure/set up a device to provide service whereas the device verification model is provided to verify a status and/or configuration of the service. In some embodiments, in response to the device verification model, a status report is received from the corresponding device that identifies status of the one or more parameters identified in the verification model. An agent may then aggregate and analyze one or more status reports to determine whether the service has been properly implemented/configured and/or is properly functioning.

Various processing agents may perform processing to create, implement, verify, and/or modify the graph representation. Each agent is associated with one or more triggering graph representation patterns that will trigger the associated agent and when the graph representation is created or modified due to the initial specification and/or as a result of processing by another agent that modifies the graph representation, it is determined whether the change affects any triggering pattern. In the event the change affects the triggering pattern, the change is notified to a processing agent associated with the affected triggering pattern. For example, processing agents may be declaratively authored with a set of one or more rules with associated callbacks. The callback function and business logic function of each agent may perform portions of the processing required to generate configurations and deploy the computing infrastructure. For example, the callback functions of various agents may perform semantic validation, gather telemetry and execution data, and/or detect anomalies during execution.

In some embodiments, the agents together in effect analyze a desired network configuration and determine and identify devices that will be utilized to implement the desired network configuration of received network requirements. Suppose L3 Clos network requirements specify the number of spine network switch devices to be 6 and the number of leaf network switch devices to be 32. In total, the agents will determine and identify 38 devices that will need to be configured to implement the desired Clos network. For each of the devices that are to be utilized, the agents would determine the individual device requirements in implementing the desired Clos network. For the L3 Clos network example, below is one example of device requirements for one of the 38 different device requirements.

Role=spine
IP address=10.0.0.3
ASN=1000
Neighbors=[(Leaf-1, 10.0.0.7, 1010), (Leaf-2, 10.0.0.15, 1011), . . . (Leaf-32, 10.0.0.176), 1042]
Status=defined The above device requirements specify that in a Clos network, one network switch device is to be a spine switch with a BGP router identifier defined as IP address 10.0.0.3 and ASN 1000. The leaf switches connected to this spine switch device have been also identified, as well as their IPs and ASNs.

In some embodiments, agents are configurable/customizable. For example, a user may modify, extend, and/or configure triggering patterns and/or callback function processing performed by the agents. The agents may be configurable/customizable via an interface such as an API.

In the example shown, one or more processing agents executed by network device 106 receive device requirements for network device 106, and one or more processing agents executed by network device 108 receive device requirements for network device 108. Each of these agents may generate and/or implement/execute native hardware instructions implementing device requirements to configure its associated individual network device.

In some embodiments, an agent hosted by network device 106 receives a device verification model for network device 106 and an agent hosted by network device 108 receives a device verification model for network device 108. Each of these agents may determine one or more status parameters to be reported to verify the corresponding device verification model and gather/detect the determined status parameters. Then each agent may provide a status report of the gathered/detected status parameters to another agent that is handling the verification of the service being provided. In some embodiments, each agent reports information about a status, an operation, and/or other information of its associated device(s). A different agent may then collect and process the reported information to report the information and/or to perform a responsive action. For example, when an agent provides a status update that its associated device is overloaded, another agent (e.g., hosted by management server 102) may add a new device to a network to offload processing and/or to move a processing task of the overloaded device to another network device. The collected status information may be provided by an agent as a report and/or a request for action.

In various embodiments, data store 104 stores the data of the graph model/representation. Data store 104 may be included in a networked storage service. In the example shown, agents access data store 104 via network 110. In some embodiments, data store 104 is directly connected to management server 102 via a non-shared connection. In various embodiments, data store 104 is included in any of the components shown in FIG. 1. For example, data store 104 may be included in management server 102. Data store 104 may include a server that manages data stored in data store 104. Examples of data store 104 include a database, a highly available storage, a distributed storage, a cloud storage, a data service, or any other type of data storage.

Network device 106 and network device 108 may be any type of device connected to network 110. Examples of network device 106 and network device 108 include a server, a network switch, a network router, a cache server, a storage device, a hypervisor switch, a virtual router, a load balancer, a firewall, a network fabric device, a virtual network device, a software device, a software component, or any type of computer or networking device that may be physical or virtual. In various embodiments, the shown agents are software and/or hardware components included in corresponding components. Examples of network 110 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly.

Although single instances of many of the components shown in FIG. 1 have been shown to simplify the diagram, additional instances of any of the components shown in FIG. 1 may exist. For example, any number of management servers, storages, and network devices may exist. Management server 102 may be a cluster of servers and storage 104 may be a distributed storage. Any number of agents may exist. A single server/device may include any number of agents. Although the example shown in FIG. 1 shows each agent included/installed in its respective associated system components, the agents may be included in different servers/devices. For example, a single agent may be assigned to processing across a plurality of network devices. Components not shown in FIG. 1 may also exist. In some embodiments, each resource (e.g., each agent, server, and network device) of FIG. 1 may belong to a domain. For example, resources belonging to the same domain are interoperable and may function together to perform a network configuration and/or management task. In some embodiments, each resource may only belong to one domain and only resources within the same domain are guaranteed to be interoperable to perform a network configuration and/or management task. Certain resources may belong to a plurality of domains. A plurality of domains may be utilized to manage a single network. The components shown in FIG. 1 may be components of one or more domains. Any of the components shown in FIG. 1 may be a physical or a virtual component.

Figure 2:
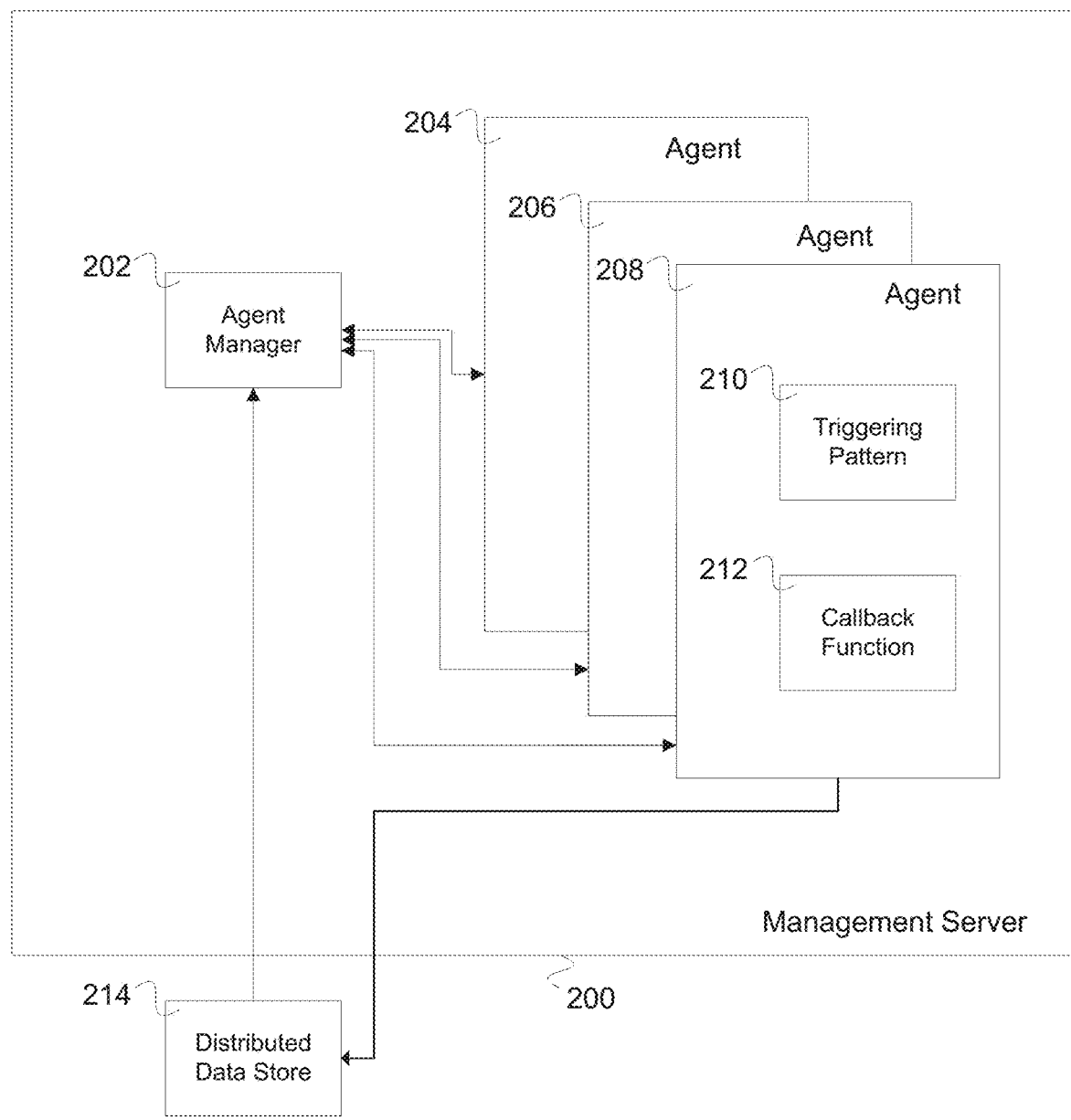
FIG. 2 is a diagram illustrating an embodiment of a management server.

FIG. 2 is a diagram illustrating an embodiment of a management server. Management server 200 may be used to implement management server 102 of FIG. 1. In the example shown, management server 200 comprises agent manager 202 and agents 204, 206, and 208. In various embodiments, a management server comprises 60, 200, 1000, or any appropriate number of agents. An agent may comprise a triggering pattern and a corresponding callback function to be called in the event the triggering pattern is present. As shown, agent 208 is associated with triggering pattern 210 and callback function 212.

In some embodiments, a central software component such as agent manager 202 is used to track all changes to a network configuration by tracking changes to a graph representation of the network configuration, wherein the graph representation accurately represents a real-time state of a network. In some embodiments, agent manager 202 comprises a query engine. As shown, agent manager 202 receives inputs from distributed data store 214. In some embodiments, the graph representation of the network configuration is stored in distributed data store 214. Inputs may comprise a current network configuration graph (e.g., graph representation of the network configuration). In some embodiments, agent manager 202 compares a current state of the network configuration graph to a previous state of the network configuration graph to determine changes in the graph. In some embodiments, agent manager 202 implements 1204 (detect portions of the graph representation that affect triggering patterns or agents) of FIG. 12. In the event a network configuration graph has changed, agent manager 202 may notify only relevant agents of the change. In various embodiments, relevant agents are determined based on their triggering patterns (e.g., whether a change in the graph affects a triggering pattern of an agent). For example, a "publish-subscribe" model may be utilized wherein an agent is subscribed to changes in the graph that affect a triggering pattern associated with the agent. In some embodiments, agents are invoked based on triggering patterns in lieu of a central change logging component.

Various actions may be required to be performed based on the network configuration graph. In various embodiments, changes in the graph cause state to be collected from a device, a link to be deleted, a node to be created, or any other appropriate action. The actions may be performed via callback functions. In some embodiments, a query of a specific triggering pattern is run one time. After a triggering pattern is specified, an associated agent may only be notified of a change in the graph in the event its triggering pattern is matched in the graph model. In some embodiments, the live querying and graph representation allow the system to be robust and scalable. In some embodiments, the framework of the system is not changed; agents, nodes, or edges are added to implement new features.

In the example shown, agents provide input to distributed data store 214. The agents may cause changes to the network configuration when associated callback functions are invoked. The changes may be stored in the network configuration graph. In some embodiments, agents implement 1208 of FIG. 12 (update the graph representation, if applicable, based on processing results of the agent callback functions).

Figure 3A:
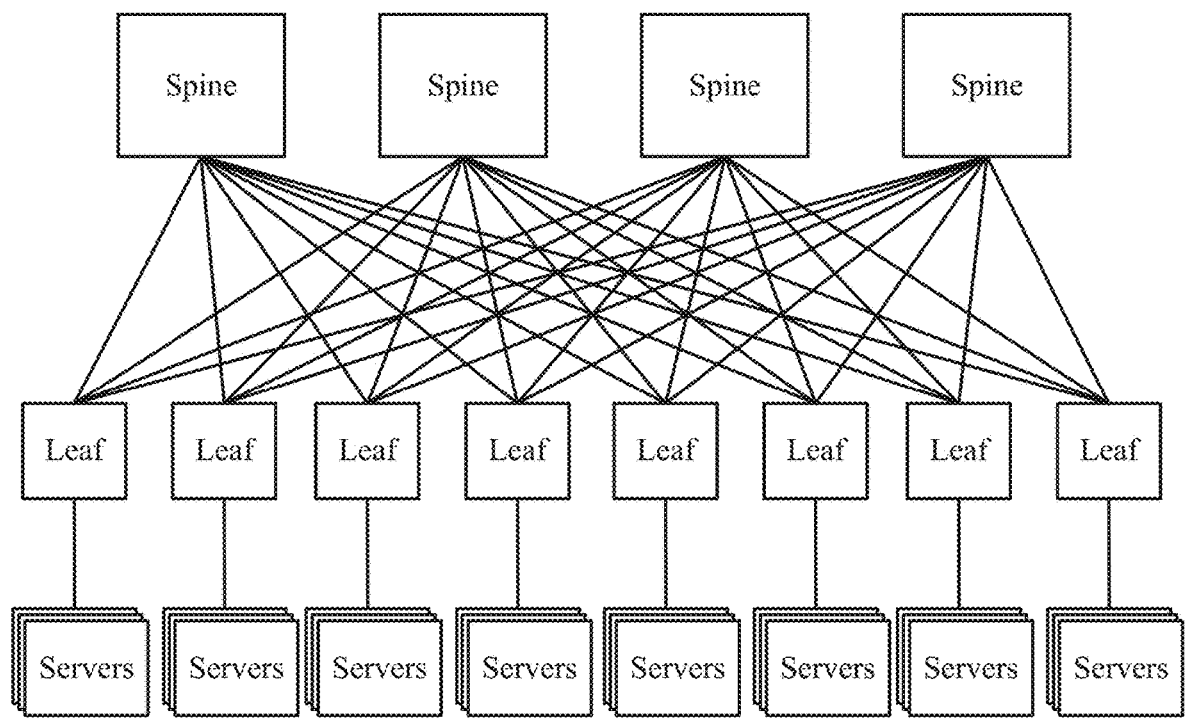
FIGS. 3A and 3B are diagrams illustrating examples of reference network types.
Figure 3B:
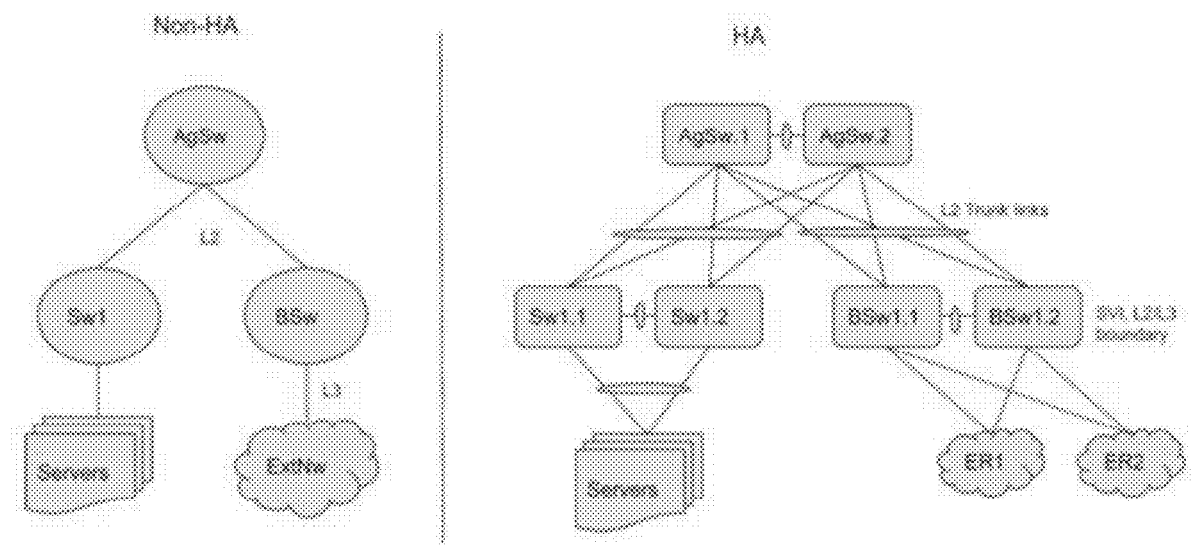

FIGS. 3A and 3B are diagrams illustrating examples of reference network types. FIG. 3A illustrates an L3 Clos (leaf-spine) design. As shown in FIG. 3A, the leaf-spine design includes spines, leafs, and servers. In various embodiments, spines are top-tier switches and leafs are lower-tier switches. In typical leaf-spine designs, and as is shown in FIG. 3A, each leaf is interconnected with each spine in a full mesh topology. In the example shown, the spine layer (e.g., spine switches) is a backbone layer that is responsible for interconnecting all leafs (e.g., leaf switches) but spines are not connected to other spines. Advantages of leaf-spine designs include deterministic latency due to east-west traffic being equidistant, redundancy if a spine fails, and relatively straightforward expansion through scaling out (e.g., if excessive oversubscription of links occurs). In various embodiments, Clos (leaf-spine) designs are implemented with Layer 3 technology in which traffic between spines and leafs are routed with protocols such as border gateway protocol or open shortest path first (OSPF). Clos (leaf-spine) designs utilizing Layer 2 technology are also possible. FIG. 3B illustrates a Layer 2 design, in non-high availability (left side of FIG. 3B) as well as high-availability (right side of FIG. 3B) formats. As shown in FIG. 3B, in a Layer 2 design, access switches may be connected to aggregation switches using single physical links (non-high availability) or with multiple physical links that use dual-sided virtual port channels (high-availability). In various embodiments, Layer 2 designs utilize Layer 2 switches and protocols (e.g., spanning tree protocols and shortest path bridging). Other reference network types not shown in FIG. 3 are also possible (e.g., core-aggregation-access designs).

Figure 4:
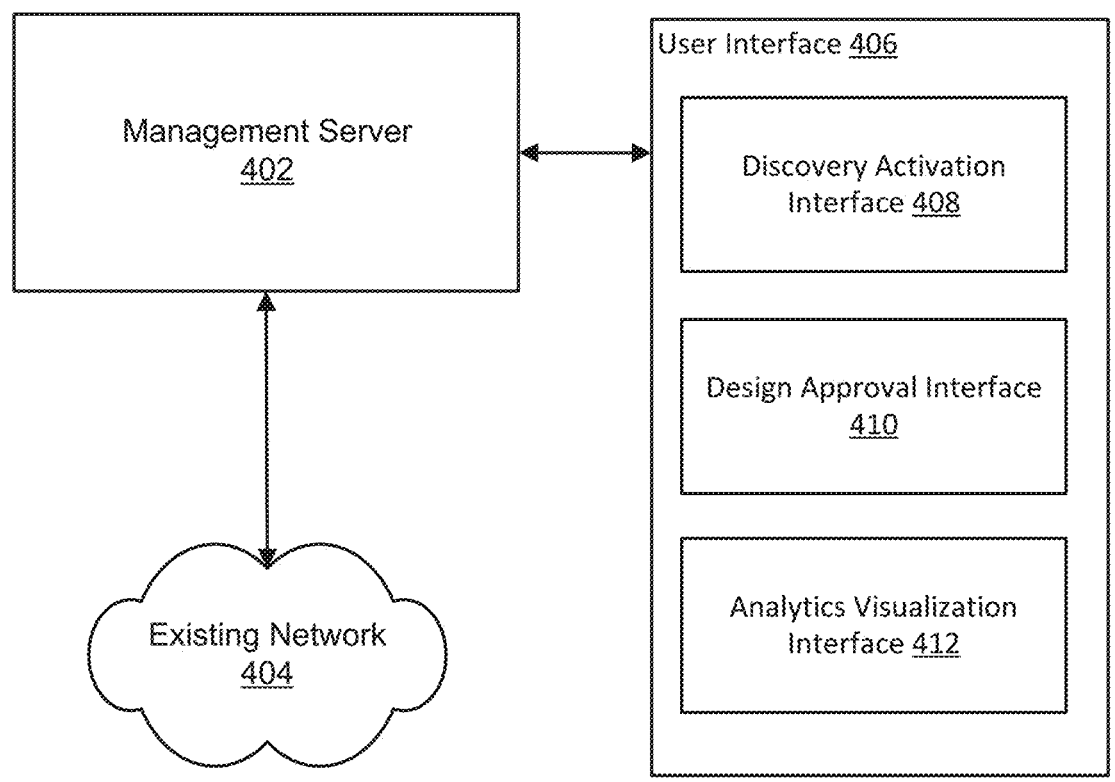
FIG. 4 is a diagram illustrating an embodiment of a system for generating an intent-based network model of an existing computer network.

FIG. 4 is a diagram illustrating an embodiment of a system for generating an intent-based network model of an existing computer network. In the example shown, the system includes management server 402 and user interface 406, which includes discovery activation interface 408, design approval interface 410, and analytics visualization interface 412. In various embodiments, management server 402 receives input via discovery activation interface 408 to generate an intent-based network model of existing network 404. In some embodiments, management server 402 includes the functionality of management server 102 of FIG. 1 and/or management server 200 of FIG. 2. Management server 402 implements and manages various agents. In some embodiments, agents provide instructions to and receive status information from various devices of existing network 404 in order to generate an intent-based network model of existing network 404. Examples of existing network 404 include one or more of the following: a direct or indirect physical communication connection, a mobile communication network, Internet, intranet, Local Area Network, Wide Area Network, Storage Area Network, and any other form of connecting two or more systems, components, or storage devices together.

In various embodiments, agents are installed from management server 402 onto devices of existing network 404 (or agents can remotely gather telemetry on the devices), a set of purpose-built telemetry and configuration collectors are created on the devices to collect telemetry and configuration data on existing network 404, and the telemetry and configuration data is analyzed to create an intent blueprint of existing network 404. User interface 406 may be used to allow for user interaction during this process. For example, a user may initiate a process for generating an intent-based network model of existing network 404 through discovery activation interface 408 (e.g., web interface, application interface, command line interface, graphical interface, API, configuration file interface, etc.) provided directly and/or remotely (e.g., via display, wired connection, network, etc.).

Through discovery activation interface 408, management server 402 may receive instructions to initiate collection of data from existing network 404 as well as receive additional information about existing network 404, such as a reference network type, network fabric properties (e.g., symmetry), seed spines (for leaf-spine designs), external router connections (for designs that connect to the Internet), IP subnet properties, links between leafs in leaf-spine designs, rack design properties (e.g., dual-leaf versus single-leaf), server properties (e.g., dual-attached versus single-attached), high availability specifications, oversubscription ratios, etc. In various embodiments, discovery activation interface 408 queries for and receives this type of information. In various embodiments, after collection of data from existing network 404 is initiated, management server 402 (using agents) collects various telemetry and configuration data. Examples of collected data include information associated with device operational status, connectivity between devices, hostnames, LLDP details, BGP details, interfaces, MLAG, VLAN details, VRF, and multicast details. In various embodiments, a blueprint of existing network 404 is created based on the collected data and information received via discovery activation interface 408. The blueprint may include a list of devices, their connections, their roles, roles of ports, IP addresses, virtual networks, ASNs, etc.

In various embodiments, after the blueprint of existing network 404 is created, it is provided directly and/or remotely (e.g., via display, wired connection, network, etc.) for user review using design approval interface 410 (e.g., web interface, application interface, command line interface, graphical interface, API, configuration file interface, etc.). The user is also able to make changes to the blueprint (e.g., submit further instructions via discovery activation interface 408) or approve the blueprint as faithfully representing design intent for existing network 404. In some embodiments, tests are performed to validate existing network 404 against constraints (e.g., implicit constraints such as connectivity according to a received reference network type, user-specified constraints, etc.). Based on validation results, additional data may be collected on existing network 404. In various embodiments, if the blueprint of existing network 404 has been approved and validated, existing network 404 is monitored using IBN tools. In some embodiments, analytics data gathered during the monitoring of network 404 is accessed and visualized via analytics visualization interface 412 (e.g., web interface, application interface, command line interface, graphical interface, API, configuration file interface, etc.) provided directly and/or remotely (e.g., via display, wired connection, network, etc.).

Figure 5:
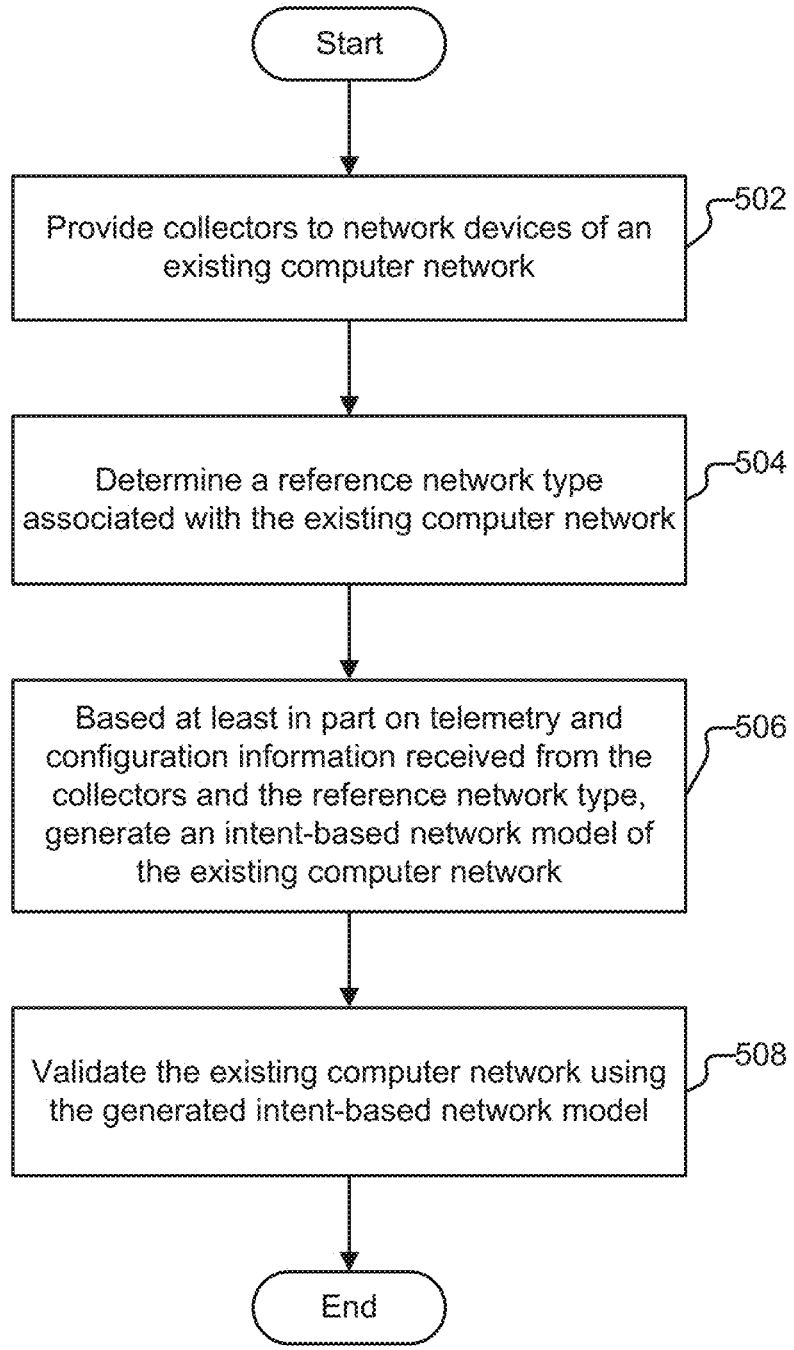
FIG. 5 is a flowchart illustrating an embodiment of a process for generating an intent-based network model of an existing computer network.

FIG. 5 is a flowchart illustrating an embodiment of a process for generating an intent-based network model of an existing computer network. In some embodiments, this process is performed by management server 102 of FIG. 1, management server 200 of FIG. 2, or management server 402 of FIG. 4.

At 502, collectors are provided to network devices of an existing computer network. In some embodiments, the collectors are agents or part of agents (e.g., software agents) installed onto network devices (e.g., agents associated with management server 102 of FIG. 1, management server 200 of FIG. 2, and management server 402 of FIG. 4). The collectors may be configured to gather various telemetry and configuration data used to reverse engineer intent. Examples of collected data include information associated with device operational status, connectivity between devices, hostnames, LLDP details, BGP details, interfaces, MLAG, VLAN details, VRF, and multicast details. In some embodiments, the type of data collected (and thus the collectors) depends on a reference network type. For example, in an L3 Clos (leaf-spine) design, VRF and multicast details may be required whereas they might not be for a Layer 2 design.

At 504, a reference network type associated with the existing computer network is determined. Examples of reference network types include L3 Clos (leaf-spine) designs, other Layer 3 designs, Layer 2 designs, traditional core-aggregation-access designs, etc. and are described in further detail with respect to FIG. 3. In some embodiments, the reference network type is determined automatically (e.g., based on network topology). For example, if it is determined that two layers of switches are connected in a full mesh topology (as is shown in FIG. 3A), then a Clos (leaf-spine) design may be inferred. In some embodiments, the reference network type is provided as an input. For example, the reference network type may be provided to management server 402 of FIG. 4 via discovery activation interface 408 of FIG. 4. In various embodiments, knowing the reference network type aids in discovering network intent and/or validation. For example, knowing the reference network type may be needed when a set of network devices can be connected according to more than one topology.

At 506, an intent-based network model of the existing computer network is generated based at least in part on telemetry and configuration information received from the collectors and the reference network type. In some embodiments, the intent-based network model is a graph representation. The graph representation may include computing network elements such as nodes and edges. Graph representations are described in further detail herein (e.g., see FIGS. 8-10). In some embodiments, for leaf-spine designs, a seed spine is also received as an input that is used to generate the intent-based network model. This is the case because it may not be possible to distinguish between a set of spine switches and a set of leaf switches without knowing the identity (spine or leaf) of at least one of the switches. In some embodiments, one spine switch starting point needs to be specified, after which all other spine and leaf switches can be identified. In some embodiments, external router information is received as an input (but not for networks that do not connect to the Internet). External router information can assist with determining boundaries of the computer network. In some embodiments, receiving approval of the generated intent-based network model is required before finalizing the model (e.g., approval that is received from design approval interface 410 of FIG. 4). In some embodiments, the intent-based network model is generated by populating telemetry service schemas, which is described in further detail herein (e.g., see FIG. 6).

At 508, the existing computer network is validated using the generated intent-based network model. In various embodiments, various tests are performed to validate the generated intent-based network model against constraints (e.g., constraints that follow from the reference network type and/or other received constraints). For example, for an L3 Clos network design, if a symmetric network fabric is specified, then if any leaf has a different uplink bandwidth relative to other leafs, an error may be flagged. Validation is described in further detail herein (e.g., see FIG. 11).

Figure 6:
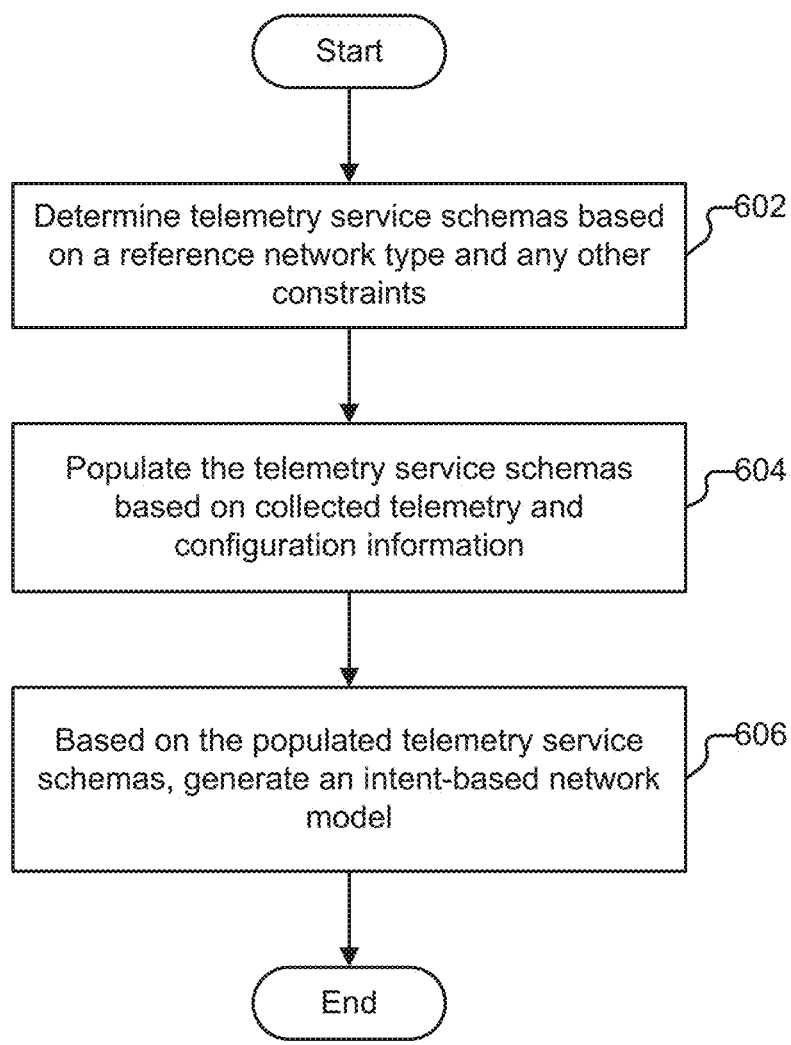
FIG. 6 is a flowchart illustrating an embodiment of a process for populating telemetry service schemas to generate an intent-based network model.

FIG. 6 is a flowchart illustrating an embodiment of a process for populating telemetry service schemas to generate an intent-based network model. In some embodiments, this process is performed by management server 102 of FIG. 1, management server 200 of FIG. 2, or management server 402 of FIG. 4. In some embodiments, at least a portion of the process of FIG. 6 is performed in 506 of FIG. 5.

At 602, telemetry service schemas are determined based on a reference network type and any other constraints. In some embodiments, telemetry service schemas relate to network properties that need to be ascertained and data that needs to be collected in order to generate an intent-based network model. For example, various templates in FIG. 7A prescribe network parameters to be ascertained. FIG. 7A divides these parameters into the following example schema groups: hostnames, LLDP details, BGP details, interfaces, MLAG, VLAN details, VRF, and multicast details (see FIG. 7A for further details). In some embodiments, different schemas are required based on the reference network type. For example, in some embodiments, VRF and multicast details may not be required for Layer 2 designs (e.g., see FIG. 3B) but might be for L3 Clos (leaf-spine) designs (e.g., see FIG. 3A). In some embodiments, the other five schema groups in FIG. 7A (hostnames, LLDP details, BGP details, interfaces, MLAG, and VLAN details) are required for both Layer 2 and L3 Clos (leaf-spine) designs.

At 604, the telemetry service schemas are populated based on collected telemetry and configuration information. In some embodiments, the telemetry service schemas are populated with telemetry and configuration data collected by agents installed onto network devices (e.g., agents associated with management server 102 of FIG. 1, management server 200 of FIG. 2, and management server 402 of FIG. 4). In some embodiments, collectors provided in step 502 of FIG. 5 collect the telemetry and configuration information. FIG. 7B shows sample collected telemetry and configuration data corresponding to the telemetry service schemas shown in FIG. 7A. Stated alternatively, FIG. 7B shows populated versions of the telemetry service schemas of FIG. 7A (see FIG. 7B for further details).

At 606, an intent-based network model is generated based on the populated telemetry service schemas. In some embodiments, the intent-based network model is a graph representation (e.g., see FIGS. 8-10). Collected telemetry and configuration information may be transferred to the graph representation to complete the graph representation. For example, the nodes and edges in the graph representation shown in FIG. 8 comprise multiple attributes, such as labels and various properties, and these attributes are present in telemetry service schemas shown in FIG. 7B. The graph representation in FIG. 8 and the telemetry service schemas of FIG. 7B both comprise string fields with descriptive names of network elements. In addition, various properties (e.g., properties associated with links, protocols, interfaces, virtual networks, MLAG, etc.) are common between the telemetry service schemas of FIG. 7 and graph representation schema of FIG. 10. Thus, information from telemetry service schemas may be transferred to graph representation schemas to create graph representation intent-based network models.

FIG. 7A shows examples of unpopulated telemetry service schemas. In some embodiments, telemetry service schemas are used to discover network intent and create intent-based network models. In some embodiments, collectors (e.g., agents or parts of agents installed on network devices of an existing network) collect telemetry and configuration information associated with the schemas. FIG. 7A shows the following telemetry service schemas: link layer discovery protocol (LLDP), border gateway protocol (BGP), interfaces, multi-chassis link aggregation (MLAG), virtual local area network (VLAN), virtual routing and forwarding (VRF), and multicast. The schemas shown in FIG. 7A are illustrative and not restrictive. Other schemas not shown are also possible. In addition, operational status, connectivity, and any other information not specified in the example schemas may also be collected by collectors (e.g., agents or parts of agents installed on network devices of an existing network). A description of the types of information associated with and collected for each of the example schemas shown in FIG. 7A is given below (see FIG. 7B description).

FIG. 7B shows examples of populated telemetry service schemas. Specifically, FIG. 7B shows populated versions of the telemetry service schemas shown in FIG. 7A. In the example shown, the "hostname" schema comprises a host name (e.g., for a network device) and its domain. In the example shown, the "lldp_details" schema comprises device information associated with the data link layer in the Open Systems Interconnection (OSI) network protocol model (e.g., chassis identification and system description). In the example shown, the "bgp" schema comprises routing path information (e.g., by specifying source and destination addresses). In the example shown, the "interface_details" schema comprises virtual interface properties (e.g., loopback) and ethernet interface properties (e.g., speed). In the example shown, the "mlag_domain" schema comprises information (e.g., peer link and common VLAN) needed to aggregate ports across two network devices. MLAG may be used in high availability topologies (e.g., as shown on the right side of FIG. 3B). In the example shown, the "vlan" schema comprises virtual LAN identifying information (e.g., IDs, names, and interfaces). In the example shown, the "vrf" schema comprises properties of virtual routers of Layer 3 virtual LANs (e.g., multicast enabled/disabled status, management/data traffic role, and interfaces). In various embodiments, vrf schemas are used for Layer 3 designs and not Layer 2 designs. In the example shown, the "multicast_info" schema comprises multicast properties when multicast is enabled (e.g., protocol mode). In various embodiments, multicast_info schemas are used for Layer 3 designs and not Layer 2 designs (e.g., due to Layer 3 routing protocols being used to multicast).

Figure 8:
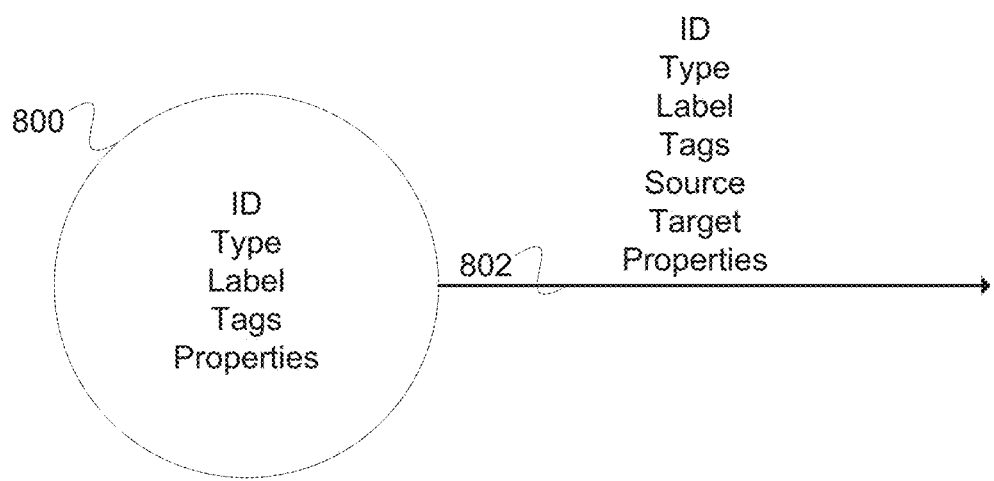
FIG. 8 is a diagram illustrating an embodiment of a node and an edge that may be included in a graph model.

FIG. 8 is a diagram illustrating an embodiment of a node and an edge that may be included in a graph model. In some embodiments, a graph model of computing infrastructure is comprised entirely of nodes and edges. All nodes may share the same structure whereas edges share the same structure. In the example shown, node 800 comprises multiple attributes comprising an identifier (ID), a type, a label, tags, and properties. In some embodiments, an ID comprises a unique identifier such as a string or integer. An ID may be used to identify the node in a graph representation and distinguish it from other nodes and edges. In some embodiments, type describes an immutable type that the node is classified as. Type may be a string. In various embodiments, a node is of type server, switch, policy, rule, user, or any abstract concept. In some embodiments, label is a user-friendly caption used to identify the node. Label may be a string. For example, a node may be labeled "server3" in the event it is type server and it is the third server present in the network. In some embodiments, tag is a flexible identifier used to group network components together. For example, a tag is used by a user to encode a group that cannot be grouped based on type. A tag may be used to encode a group not available in a graph schema associated with the graph representation. A tag may be used to group together a subset of nodes of a same type, a group of edges of different types, or any combination of nodes and edges. The tag may be a user-friendly format, such as a string (e.g., "high availability servers"). In some embodiments, properties comprise properties of the node or data associated with the node. In some embodiments, properties comprise a key-value list of any data desired to be associated with the node. For example, properties may comprise information relating to a computer memory size or server speed. Properties may comprise telemetry data.

As shown, edge 802 comprises multiple attributes comprising an ID, a type, a label, tags, a source, a target, and properties. In some embodiments, an edge in a graph representation of a network configuration comprises the same attributes as a node in the graph representation (e.g., ID, type, label, tags, properties) with the addition of a source and target.

In some embodiments, an ID comprises a unique identifier such as a string or integer. An ID may be used to identify the edge in a graph representation and distinguish it from other nodes and edges. In some embodiments, type describes an immutable type that the edge is classified as. Type may be a string. In various embodiments, an edge is of type "link," "interfaces," "hosted_on," "applies_to," or any abstract concept. In some embodiments, label is a user-friendly caption used to identify the edge. Label may be a string. For example, an edge may be labeled "hosted_on" because the edge is of type "hosted_on." In some embodiments, tag is a flexible identifier used to group network components together. For example, a tag is used by a user to encode a group that cannot be grouped based on type. A tag may be used to encode a group not available in a graph schema associated with the graph representation. A tag may be used to group together a subset of edges of a same type, a group of nodes of different types, or any combination of nodes and edges. The tag may be a user-friendly format, such as a string (e.g., "open_connections"). In some embodiments, properties comprise properties of the edge or data associated with the edge. In some embodiments, properties comprise a key-value list of any data desired to be associated with the edge. For example, properties may comprise information relating to a computer memory size or server speed. Properties may comprise telemetry data.

In some embodiments, an edge is directional and represents a relationship between two nodes. In some embodiments, source refers to an edge's source/originating node and target refers to an edge's target/destination node. Source and target may consist of strings that refer to nodes in the graph representation. For example, a source and a target of an edge in a graph model may comprise IDs of nodes present in the graph model. An edge may represent a one-way relationship between two nodes. Multiple edges may exist between two nodes. For example, a switch node (e.g., node of type "switch") may have a relationship of hosting an interface node (directional from switch node to interface node) whereas the interface node may have a relationship of "hosted_on" in regards to the switch node (directional from interface node to switch node). As shown, edge 802 is directional, wherein node 800 is its source, and its target is a node that it points to. In a network configuration graph representation, each edge may have a source and target node.

In some embodiments, not all attributes (e.g., ID, type, tag, etc.) are required to be specified in creation of a node or edge. Default attributes may be used. For example, given a source and target, an edge type may be inferred. In some embodiments, an edge type is inferred based on node types of the source and target. In some embodiments, an ID and label are randomly generated and/or automatically generated. For example, a label may be incremented to label nodes "server_1," "server_2," and so forth as nodes of type "server" are created. Properties may be determined based on type. A default setting for tags may comprise no tags.

In some embodiments, the graph representation allows diverse concepts to be represented with flexibility while the structure of graph elements remains static. The graph representation may allow for a robust and scalable system. For example, a node of type policy may comprise properties describing the policy as using a specific resource pool. An edge of type "policy_applies_to" with the node of type "policy" as a source and a node of type "switch" as a target represents that the policy is implemented on a switch. An agent with a triggering pattern of an edge of type "policy_applies_to" with a source node of type "policy" and a target node of type "switch" may invoke an agent that implements the policy in the event a portion of the graph representation matches the pattern of edge of type "policy_applies_to" with a source node of type "policy" and a target node of type "switch."

In some embodiments, telemetry data collected during use and execution of the computing infrastructure is mapped to corresponding graph elements to provide (e.g., visually) a representation of the telemetry data in the graph model format. In some embodiments, properties of nodes or edges comprise telemetry data gathered from devices. For example, amount of traffic sent/received, number of errors, fan speed, temperature, number or type of control processes running, or any other appropriate operational data is stored. In some embodiments, the graph model is updated with real-time telemetry data. A user may use a query language (e.g., GraphQL) to access telemetry information or other information in the network configuration graph. In some embodiments, telemetry information is read-only. Telemetry data may be stored in a key-value format wherein a key comprises a parameter (e.g., fan speed) and a value comprises a measured parameter value (e.g., fan speed in rotations per millisecond).

The graph representation may change as the requirements change and properties associated with graph representation elements are updated. In some embodiments, a change in the graph representation is detected and it is determined whether the change affects a triggering graph representation pattern. For example, processing agents that perform processing may each be associated with one or more triggering patterns that trigger processing of the associated agent. In the event the detected change affects the triggering pattern of a processing agent, the change may be reported to the agent associated with the triggering pattern. Each agent may be associated with a triggering pattern that identifies a portion of the graph representation of interest that will trigger processing of the agent. If the graph representation includes at least a portion that matches a triggering pattern of an agent (e.g., change to declarative requirements changes the graph representation portion that matches the triggering pattern specified for an agent), a processing function of the matched agent may be invoked to allow the processing function to perform processing associated with the matched graph representation portion.

Figure 9A:
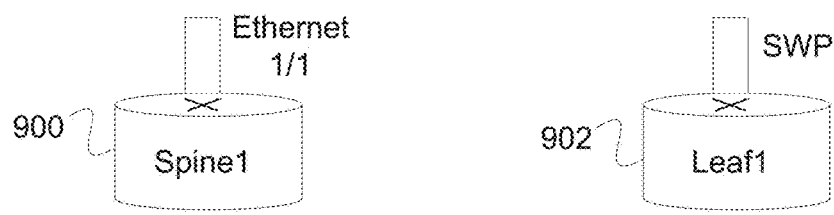
FIG. 9A is a diagram illustrating an embodiment of network devices.

FIG. 9A is a diagram illustrating an embodiment of network devices. Two switches are shown. In some embodiments, the two switches may be connected via a cable between the two. In some embodiments, the example shown is a network configuration desired by a user. For example, the intent may specify two switches with a cable connecting the two. As shown, switch 900 is labeled "spine1" and switch 902 is labeled "leaf1." As shown, an interface of switch 900 is labeled "Ethernet 1/1" and an interface of switch 902 is labeled "SWP."

Figure 9B:
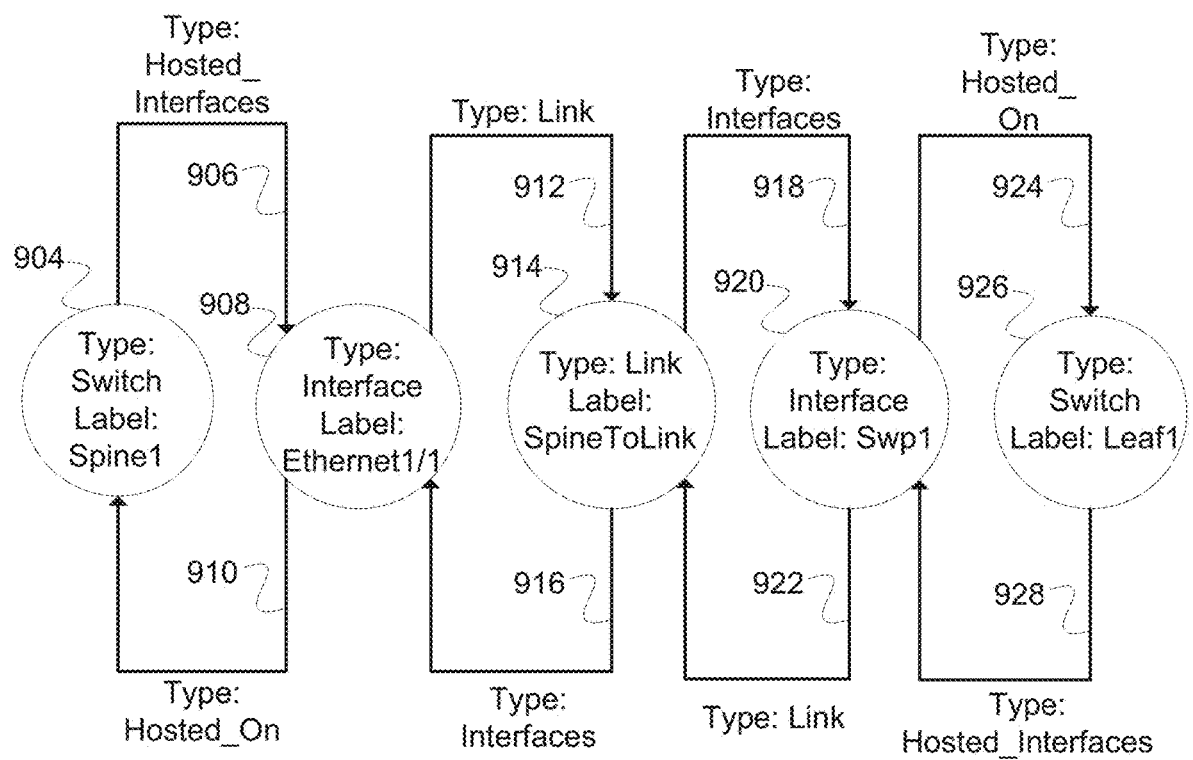
FIG. 9B is a diagram illustrating an embodiment of a portion of a graph model.

FIG. 9B is a diagram illustrating an embodiment of a portion of a graph model. In some embodiments, the graph model portion represents the network device configuration of FIG. 9A. Node 904 is of type "switch" and label "spine1" and represents switch 900 of FIG. 9A. Node 926 is of type "switch" and label "leaf1" and represents switch 902 of FIG. 9A.

Node 908 as shown is of type "interface" and label "Ethernet 1/1." Edges 906 and 910 describe the relationship between the Ethernet 1/1 node (908) and spine1 node (904). Edge 906 of type "hosted_interfaces" has node 904 as a source node and node 908 as a target node. Edge 910 of type "hosted_on" has node 908 as a source node and node 904 as a target node. Node 920 is of type "interface" and label "swp1." Edges 924 and 928 describe the relationship between the leaf1 node (926) and swp1 node (920). Edge 924 of type "hosted_on" has node 920 as a source node and node 926 as a target node. Edge 928 of type "hosted_interfaces" has node 926 as a source node and node 920 as a target node.

Node 914 is of type "link" and label "SpineToLink." The node has relationships with the interfaces of the spine1 node and leaf1 node. Edges 912 and 916 describe the relationship between the Ethernet 1/1 node and the spineToLink node. Edge 912 of type "link" has node 908 as a source node and node 914 as a target node. Edge 916 of type "interfaces" has node 914 as a source node and node 908 as a target node. Edges 918 and 922 describe the relationship between the swp1 node and the spineToLink node. Edge 922 of type "link" has node 920 as a source node and node 914 as a target node. Edge 918 of type "interfaces" has node 914 as a source node and node 920 as a target node.

FIG. 9C is an example of a triggering pattern. The example shows a triggering pattern expressed in a programming language (e.g., Python). In the example shown, a specific combination and order of specific nodes and edges is defined. Any appropriate programming language may be used to define a triggering pattern. In some embodiments, the example shown describes a part of the graph model portion shown in FIG. 9B. For example, "node (type='switch')" at 960 describes node 904 of FIG. 9B, ".out('hostedinterfaces')" at 962 describes edge 906 of FIG. 9B, and ".node('interface')" at 964 describes node 908 of FIG. 9B.

The triggering pattern as shown defines outgoing relationships from left (node 904 of FIG. 9B) to right (node 926 of FIG. 9B) as shown in FIG. 9B, whereas outgoing relationships from right to left as shown in FIG. 9B are not described. For example, the triggering pattern describes only a part of the graph model portion shown in FIG. 9B. In some embodiments, an agent associated with the triggering pattern shown is invoked in the event the graph model portion shown in FIG. 9B is detected in, added to, modified in, or deleted from a graph model.

FIG. 9D is an example of a triggering pattern. In some embodiments, one or more relevant data structures are specified in the triggering pattern. The one or more relevant data structures may be specified using labels (e.g., label attributes of nodes or edges). In some embodiments, a callback function associated with the triggering pattern is called with a reference to a data structure that is specified in the triggering pattern (e.g., by label). For example, in the event a portion of a network configuration graph matches a triggering pattern of an agent, the agent may be provided a path to a specific node or edge. In some embodiments, the specific node or edge is present in the portion of the graph model that matches the triggering pattern. The agent's callback function may be called with the reference or path to the specific node or edge, allowing the function to be implemented on the specific node or edge. For example, a callback function may comprise a label in the callback function that matches a label in the triggering pattern. The label allows the callback function to execute an action on a node or edge in the graph model, wherein the node or edge in the graph model matches the labeled node or edge in the triggering pattern. The use of a graph model and the label attribute allows a reference to a data structure to be easily passed on. In some embodiments, the callback function is called with multiple references to multiple data structures.

In the example shown, the triggering pattern defines "node(type='switch', label='local_device')" at 980. In some embodiments, in the event a portion of the graph representation matches the triggering pattern, a node that matches the node defined at 980 is labeled as "local_device." A callback function associated with an agent that is associated with the triggering function may be defined with "local_device" as an input. A reference to the node in the graph representation that matches the node defined at 980 may be passed to the callback function in the event the callback function is invoked.

Figure 10:
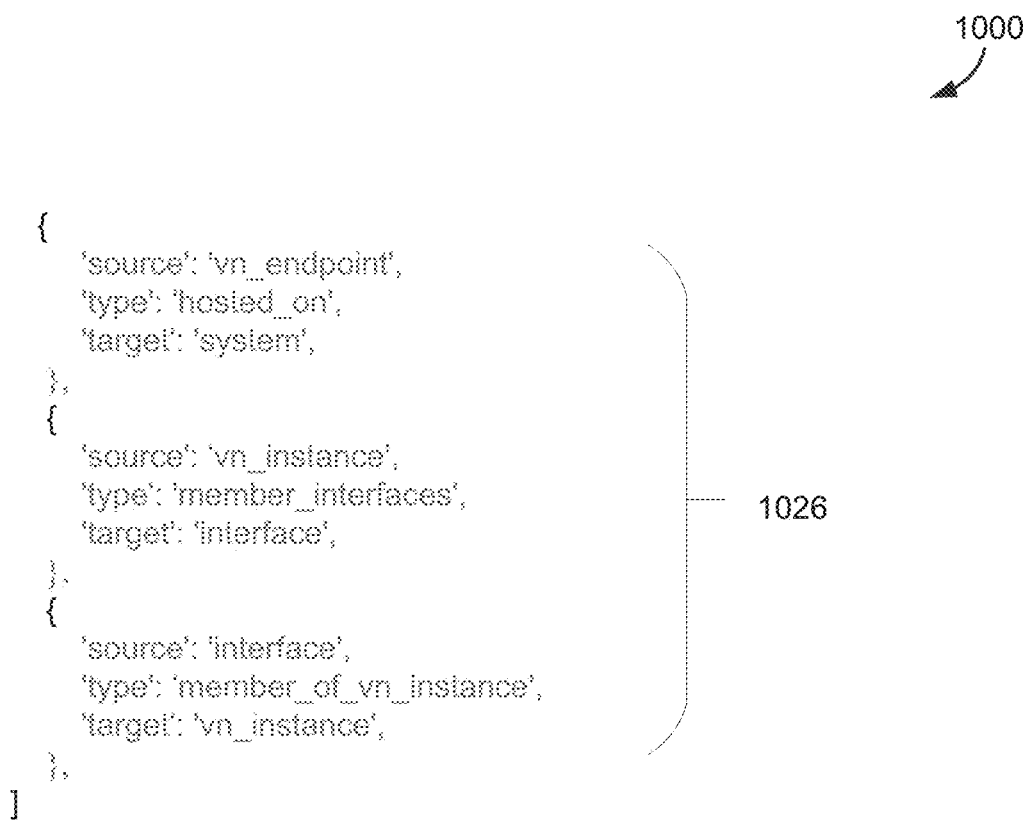
FIG. 10 shows an example of a model schema (e.g., in Python format) for a graph model.

FIG. 10 shows an example of a model schema (e.g., in Python format) for a graph model. In some embodiments, a graph model of a network has an associated graph model schema. Valid nodes, edges, and relationships between nodes and edges may be defined in the schema. For example, only nodes of a first type may be allowed to share an edge with nodes of a second type. Invalid relationships or nodes may invoke a callback function. For example, the callback function may provide an error to a user or discard the last received change in intent. The schema may be domain-specific; different schemas may exist for different network architectures.

Model schema 1000 is written in Python, but any computer language may be used to implement the model schema. The example shows a graph model schema for a typical leaf-spine network architecture. The disclosed system may treat individual design schemas as opaque and operate only at the graph meta model comprising just nodes and relationships. As shown, model schema 1000 describes allowed data types and values. As shown, 1020, 1022, 1024, and 1026 comprise allowed relationships under the schema. For example, an edge of type "composed_of" must have a source node of type "link" and a target node of type "link"; an edge of type "part_of" must have a source node of type "link" and a target node of type "link"; and an edge of type "hosted_interfaces" must have a source node of type "system" and a target node of type "interface".

Figure 11:
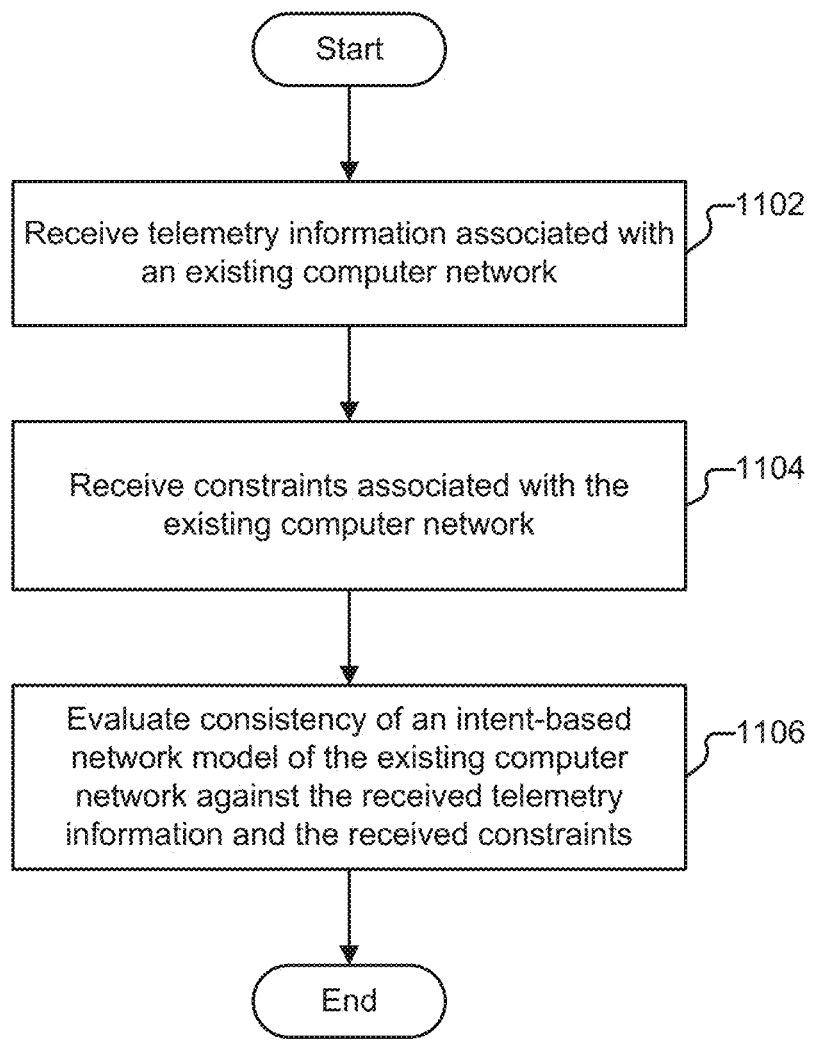
FIG. 11 is a flowchart illustrating an embodiment of a process for validating an existing computer network.

FIG. 11 is a flowchart illustrating an embodiment of a process for validating an existing computer network. In some embodiments, this process is performed by management server 102 of FIG. 1, management server 200 of FIG. 2, or management server 402 of FIG. 4. In some embodiments, at least a portion of the process of FIG. 11 is performed in 508 of FIG. 5.

At 1102, telemetry information associated with the existing computer network is received. Examples of received telemetry information include information associated with device operational status and connectivity and information populating telemetry service schemas (e.g., see FIG. 7B), such as hostname, LLDP, BGP, interface, MLAG, VLAN, VRF, and multicast details. Additional examples of received telemetry information include a list of devices, their connections, their roles, roles of ports, IP addresses, subnets, virtual networks, autonomous system numbers, etc. In various embodiments, telemetry information is collected by agents installed on network devices (e.g., network devices 106 and 108 of FIG. 1).

At 1104, constraints associated with the existing computer network are received. Examples of constraints include implicit constraints and user specified constraints. In various embodiments, implicit constraints are based on and inherent to a reference network type. For example, in an L3 Clos (leaf-spine) design (e.g., see FIG. 3A), each leaf must be connected to each spine, whereas this does not need to be the case for other reference network types. Another example of an implicit constraint is that in both L3 Clos (leaf-spine) and Layer 2 designs, virtual network subnets must be unique across the existing computer network within a given VRF domain. In various embodiments, user specified constraints are specific to a given network because they are specified by a user. For example, in an L3 Clos (leaf-spine) design, a user specified constraint could be fabric symmetry (e.g., every leaf should have the same number and/or speed of uplinks to every spine). Another example of a user specified constraint is high availability in a Layer 2 design (e.g., see the comparison of non-high availability and high availability variants of the Layer 2 design of FIG. 3B and the associated description).

Figure 16:
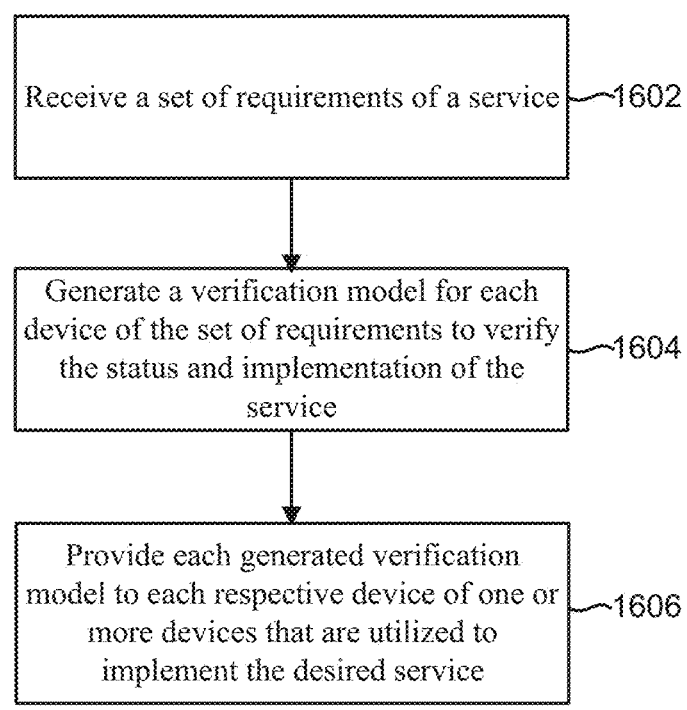
FIG. 16 is a flowchart illustrating an embodiment of a process for generating a verification model.
Figure 17:
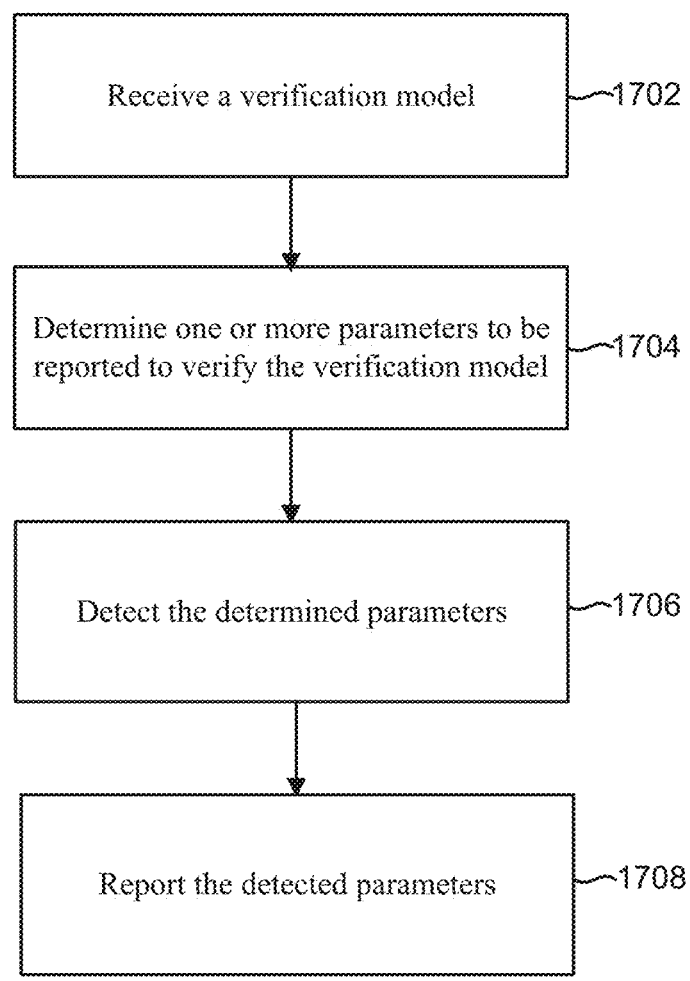
FIG. 17 is a flowchart illustrating an embodiment of a process for detecting status parameters.
Figure 18:
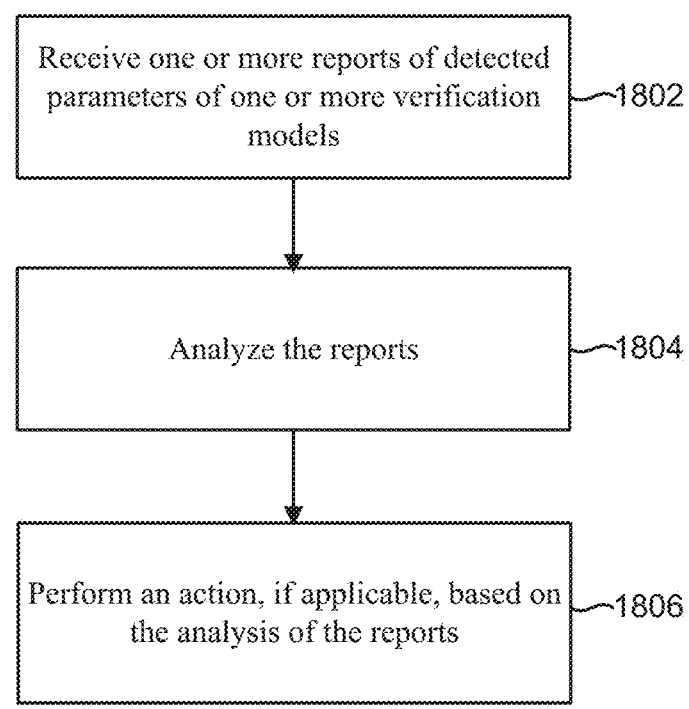
FIG. 18 is a flowchart illustrating an embodiment of a process for analyzing verification reports.

At 1106, consistency of an intent-based network model of the existing computer network is evaluated against the received telemetry information and the received constraints. In some embodiments, when inferring intent, intent has some constraints (e.g., need to have certain devices with specified roles, certain device connections are set, etc.). This information may be relied upon during validation. In various embodiments, if the received telemetry indicates a violation of a received constraint, an error is raised. For example, in an L3 Clos (leaf-spine) design, if received telemetry with respect to connectivity indicates that the implicit constraint of each leaf being connected to each spine is violated, then an error would be raised. A scenario in which this happens could be if a leaf has links to only 3 out of 4 spines (e.g., due to absence of a physical cable or a faulty cable). Similarly, an error would be raised if a user specified constraint (e.g., fabric symmetry) has been violated based on the received telemetry. In some embodiments, the verification processes of FIGS. 16-18 are used to, at least in part, validate the existing computer network.

In some embodiments, the user provides information that is used for validation. This information may be provided before validation (e.g., before validation via discovery activation interface 408 of FIG. 4). In some embodiments, such information may be requested and received during validation. In some embodiments, when IP address telemetry information is collected, it is not possible to determine from just the IP addresses if they are in a correct range, correct subnet, etc. Thus, the user may need to supply this information as part of validation. For example, when overlapping IP address spaces are detected via telemetry, the IP addresses are potentially incorrect, but may be correct depending on user intent (e.g., when isolating to separate domains, IP addresses might need to be re-used). For IP addresses, a user specified constraint may be that all fabric links be in a specified subnet. With respect to racks, racks may be single or dual-leaf (e.g., dual-leaf racks have some set of links in between them). Rack design may include constraints (e.g., connections between servers on racks may have constraints). Oversubscription (e.g., ratio of traffic fed into leaves versus fabric bandwidth) may also be subject to constraints that are used during validation.

Figure 12:
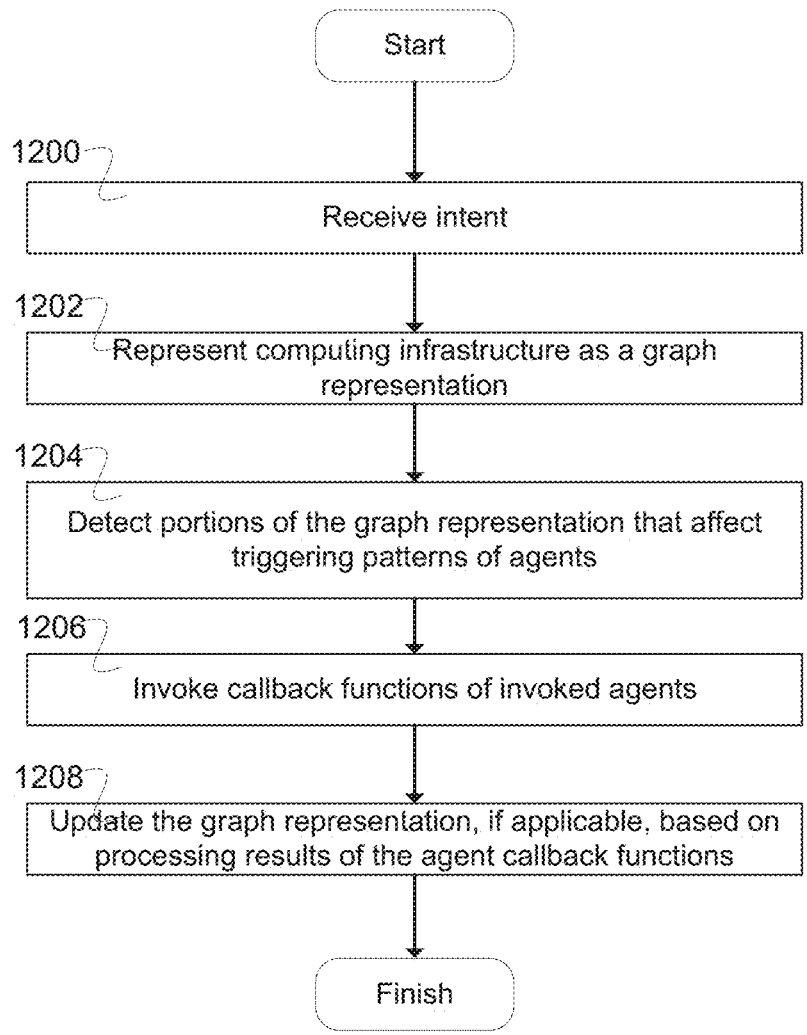
FIG. 12 is a flowchart illustrating an embodiment of a process for automatically configuring a computing infrastructure using a graph model.

FIG. 12 is a flowchart illustrating an embodiment of a process for automatically configuring a computing infrastructure using a graph model. In some embodiments, the process is implemented in management server 102 of FIG. 1, management server 200 of FIG. 2, or management server 402 of FIG. 4. At 1200, intent is received. The intent comprises a desired computing infrastructure configuration. The intent may specify a desired service, a reference architecture, and/or a network requirement. In some embodiments, the intent is a result of a business rule change initiated by a network operator or an operational status change (e.g. a network component is disabled). At 1202, a computing infrastructure is represented as a graph representation. In some embodiments, business rules and policy elements are also represented in the graph representation. For example, the intent may be processed to determine a graph of nodes and edges in implementing the intent. In some embodiments, network devices are represented by nodes whereas relationships between devices are represented by edges. In various embodiments, policies, rules, interfaces, abstract information, or any other appropriate network configuration information is represented in the graph via nodes and edges. In the event the intent indicates a change to an existing network configuration, the intent may be processed and represented as changes to an existing graph model (e.g., by modifying nodes or relationships, deleting nodes or relationships, or adding nodes or relationships). In the event the intent is a first indication of intent for a network, a new graph model may be created based on the intent. In some embodiments, the network is not deployed until sufficient configuration parameters are indicated in the intent. For example, network devices may be configured but not taken online.

At 1204, portions of the graph representation that affect triggering patterns of agents are detected. For example, an agent may be associated with a specific triggering pattern of interrelated nodes and edges. In some embodiments, a triggering pattern is written in a programming language (e.g., Python, PERL, Java, etc.). A triggering pattern may describe a portion of a graph model. In some embodiments, a triggering pattern defines an attribute of a node or edge (e.g., type, property, or tag). In some embodiments, a triggering pattern defines nodes and edges of specific types and defines how the nodes and edges are interrelated in a specific configuration. Changes to the graph representation may cause a specific pattern to occur in the graph representation that was not previously present, invoking an agent associated with the specific pattern. For example, an agent may be invoked based on detection of a specified chain of nodes and relationships of specific types and in a specific order indicated by the pattern. In some embodiments, a triggering pattern associated with an agent matches at least a portion of the graph representation prior to a change to the graph representation and the change to the graph representation modifies (e.g., changes or deletes) the portion of the graph representation that previously matched the triggering pattern. This may result in invocation of the agent in response to detecting that the matching graph representation portion has been modified. For example, the pattern may specify a specific configuration of two specific types of linked nodes and this pattern is detected in the graph representation. A change to a property of any node of the graph representation belonging to a graph portion matching a pattern may invoke the callback function associated with the pattern. In another example, a removal of any element of a portion of the graph representation that used to match a triggering pattern may invoke that agent associated with the triggering pattern.

At 1206, callback functions of invoked agents are invoked. In some embodiments, an agent is associated with a triggering pattern and a callback function. In the event a triggering pattern of an agent is detected, the agent is invoked and a callback function associated with the agent is invoked. The callback functions execute commands (e.g., to implement at least a portion of the intent). For example, the graph model is updated and network devices are configured by the callback functions triggered by detected changes to the appropriate portions of the graph representation associated with triggering patterns. In some embodiments, using a publish-subscribe model of triggering patterns and callback functions, changes to the network configuration are able to be implemented incrementally.

At 1208, the graph representation is updated, if applicable, based on processing results of the agent callback functions. In some embodiments, a callback function causes modifications, additions, or deletions of nodes or edges in the graph representation. The graph representation is updated based on any changes caused by agent callback functions. In some embodiments, the changes to the graph representation caused by the callback function invoke one or more additional callback functions. In some embodiments, the graph representation accurately represents the network configuration at any given time. Changes to the network configuration may be implemented by changing the graph representation, wherein changing the graph representation triggers agents to perform callback functions that execute the changes.

Figure 13:
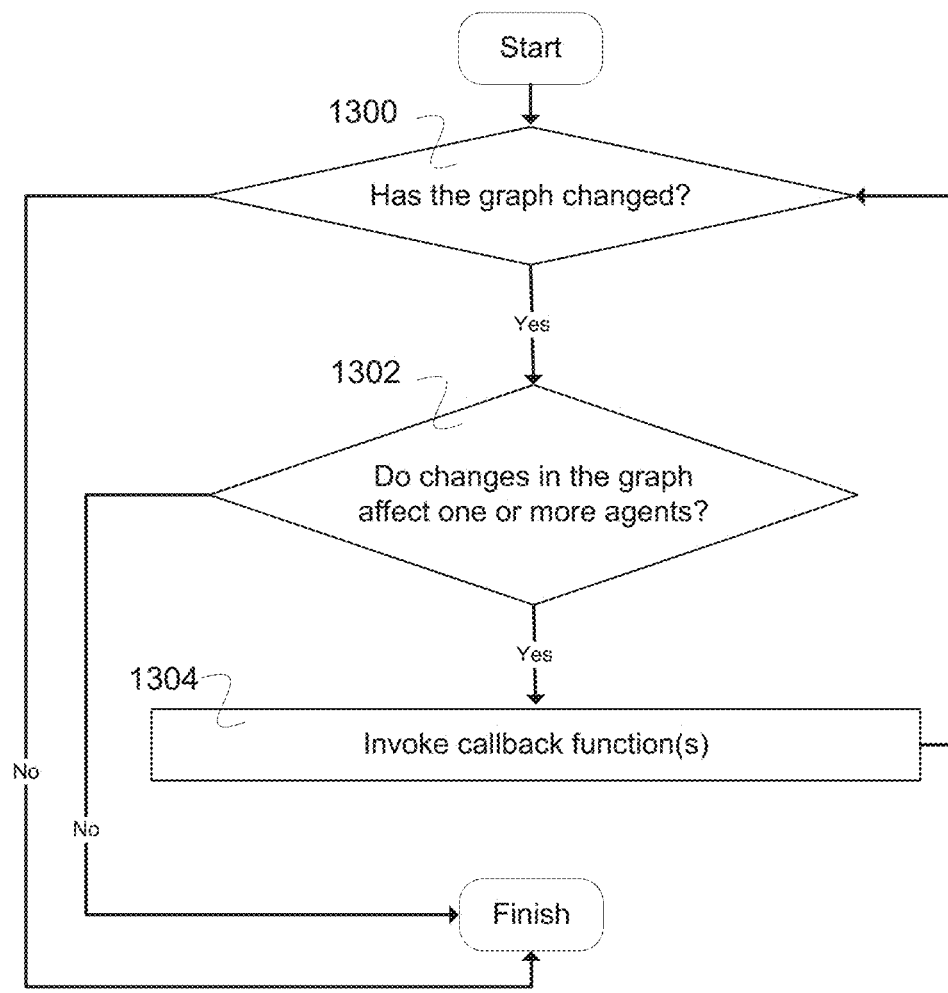
FIG. 13 is a flow diagram illustrating an embodiment of a process for invoking callback functions.

FIG. 13 is a flow diagram illustrating an embodiment of a process for invoking callback functions. In some embodiments, the process implements 1204 and 1206 of FIG. 12. In some embodiments, the process is implemented by agent manager 202 of FIG. 2. At 1300, it is determined whether the graph has changed. The graph may change based on a received intent or based on invoked callback functions. In some embodiments, changes to the graph caused by one agent trigger another agent. In the event the graph has not changed, the process is finished. In some embodiments, the process is repeated while the network is active (e.g., desired to be configured). In the event the graph has changed, at 1302, it is determined whether changes in the graph affect one or more agents.

In some embodiments, changes to the graph representation invoke an agent in the event a portion of the graph representation associated with a triggering pattern of the agent is detected in, added to, updated in, or removed from the graph representation. In some embodiments, a detection or addition of a portion of the graph representation matching the specific triggering pattern to the graph representation occurs in the event changes to the graph representation cause a portion of the graph representation to match the specific triggering pattern, wherein the portion of the graph representation did not previously match the specific triggering pattern. For example, a portion of the graph representation matching the specific triggering pattern is detected in the graph representation in the event existing nodes and edges in the graph are modified such that a portion of the graph matches the specific triggering pattern. A portion of the graph representation matching the specific triggering pattern is added to the graph representation in the event a new graph portion matching the specific triggering pattern is added to the existing graph.

In some embodiments, a portion of the graph representation matching the triggering pattern in the graph representation is updated in the event the change in the graph representation modifies a node or edge within a portion of the graph representation that matched the specific triggering pattern prior to the change and the portion continues to match the specific triggering pattern following the change.

In some embodiments, a portion of the graph representation associated with the triggering pattern is deleted from the graph representation in the event a change to the graph representation modifies the portion of the graph representation that previously matched the triggering pattern such that the portion of the graph representation no longer matches the triggering pattern. For example, a node or edge may be deleted from the portion of the graph that previously matched the triggering pattern, a node or edge in the portion of the graph that previously matched the triggering pattern may be altered (e.g., an attribute such as type is changed), or the portion of the graph that previously matched the triggering pattern may be deleted in entirety.

In the event changes in the graph do not affect one or more agents, the process is finished. In the event changes in the graph affect one or more agents, at 1304, callback function(s) are invoked. For example, one or more callback functions associated with the one or more agents are invoked. In some embodiments, the callback function is provided an indication of whether a portion of the graph representation associated with a triggering pattern is detected in, added to, updated in, or removed from the graph representation. In some embodiments, different callback functions are called based on the indication in order to perform different actions based on the indication. For example, in the event a specific node-relationship pattern is added to the network configuration graph, the callback function allocates resources (e.g., allocating an IP address for a node of type "link"). In the event the pattern is removed, the callback function removes the resource request for the node.

Figure 14:
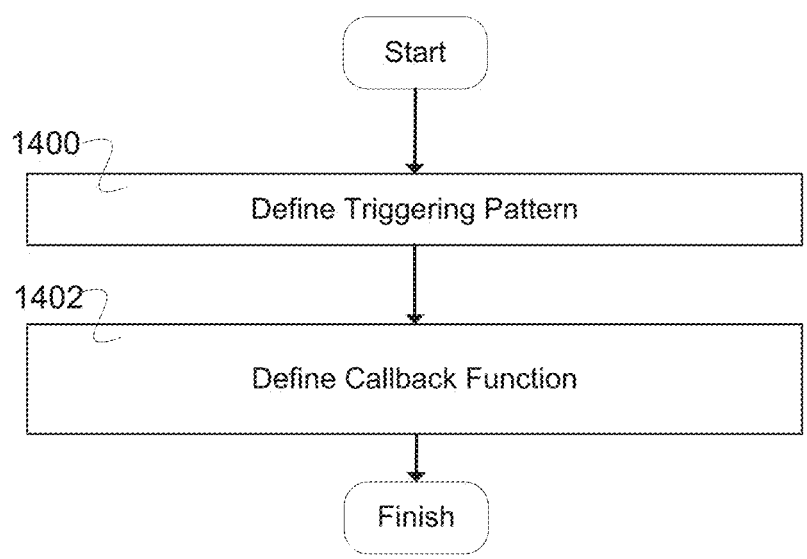
FIG. 14 is a flowchart illustrating an embodiment of an agent creation flow.

FIG. 14 is a flowchart illustrating an embodiment of an agent creation flow. In some embodiments, an agent is created to perform a callback function based on a triggering pattern. Multiple agents, each tracking a different triggering pattern, may work together to configure the network appropriately based on changes in a graph model of computing infrastructure. In some embodiments, a modular method of using separate agents increases efficiency in processing changes in intent.

In some embodiments, a set of pre-created agents is associated with a specific network architecture (e.g., leaf-spine architecture). For example, a set of agents and a schema may be associated with a network with leaf-spine architecture. Each network architecture type may have a corresponding schema and set of agents. In some embodiments, a schema or set of agents is customized for a network. Features may be added to the network configuration system by creating or modifying agents. For example, the system may be easily scaled by writing logic to add agents.

The example shown illustrates a process to create an agent. At 1400, a triggering pattern is defined. The triggering pattern may comprise a portion of a graph model of computing infrastructure. An agent may be triggered by edges, nodes, properties, or any aspect of the network configuration graph. In some embodiments, an agent comprises multiple triggering patterns. In some embodiments, each agent has a single triggering pattern. An agent may inject its triggering pattern as a query to a query engine in the management server (e.g., management server 102 of FIG. 1). At 1402, a callback function is defined. In some embodiments, the callback function defines an action to be taken based on the triggering pattern. For example, an agent may be associated with a triggering pattern of a node of type "link" and with a callback function that assigns an IP address. The agent may cause a callback function to assign an IP address in the event a node of type "link" is added to the graph model. In some embodiments, a callback function takes nodes or edges of the graph model as input. For example, the function may be executed based at least in part on a node or edge in a portion of the graph model that matches the triggering pattern.

In some embodiments, an agent comprises a collection of callback functions. For example, different functions may be executed based on whether a portion of a graph model associated with the triggering pattern was added to, modified in, or deleted from the graph model (e.g., whether a portion of the graph model is changed to match the triggering pattern, a property of an edge or node in a portion of the graph model that matches the triggering pattern is changed, or a portion of the graph model matching the triggering pattern is changed to no longer match the triggering pattern). The agent may store multiple functions, wherein the functions are executed based on a type of change in a portion of a graph model associated with the triggering pattern (e.g., "added," "modified," or "deleted"), a type of a changed data structure, a position of a changed data structure, a reference/path to a data structure, or any other factor. For example, a triggering pattern may comprise a node of type device with an edge of type link connecting it to a node of type link. One callback function may define an action to be executed in the event the node of type device changes properties, whereas another callback function may define an action to be executed in the event the node of type link is deleted. In the event a triggering pattern defines a pattern comprising two nodes of a same type, different callback functions may be called based on which node is changed.

Agents may serve various roles in configuring the network. In some embodiments, a resource allocation agent is associated with a triggering pattern that represents one or more network elements that require resources to be allocated when the one or more elements are present in a network. A callback function associated with the resource allocation agent may execute actions that allocate resources required for the one or more network elements. For example, a networking configuration graph may be changed to add a cable to the network. A resource allocation agent associated with a triggering pattern of the specific nodes and edges that are created to add a cable may be invoked. A callback function associated with the resource allocation agent may be invoked, causing allocation of resources required for the cable.

In some embodiments, an agent is used to determine whether changes in the graph are consistent with a graph schema associated with the graph. A semantic validation agent may determine whether the graph is ready for downstream processing based on the graph schema. In the event the graph does not fulfill rules stated in the graph schema, the changes may be inapplicable. For example, certain device configurations cannot be rendered in the event IP addresses are unassigned or invalid. For example, a semantic validation agent may be associated with a triggering pattern of an edge type "instantiated_by." The graph schema may indicate that edges of type "instantiated_by" must have a source node of type "virtual_network" and a target node of type "vn_instance." In the event an edge of type "instantiated_by" is added to the graph model, the semantic validation agent may be triggered. An associated callback function of the semantic validation agent may determine whether a source node of the edge is of type "virtual_network" and whether a target node of the edge is of type "vn_instance." In the event the source and target nodes are not of expected types as defined in the graph schema, an error message may be provided to a user.

In some embodiments, an agent performs checks associated with a triggering pattern once the pattern is detected. For example, an agent performs a check on nodes and edges surrounding a node of type "switch" to ensure required nodes and edges are present. In some embodiments, an agent raises alerts or adjusts the network configuration in the event a network component is operating at undesired ranges. For example, an agent may be associated with a triggering pattern of a property of a node of type "server." In the event a change in a property of the node indicates the server is operating at a high temperature, an associated callback function of the telemetry data agent may be invoked to shut down the server associated with the node of type "server."

Figure 15:
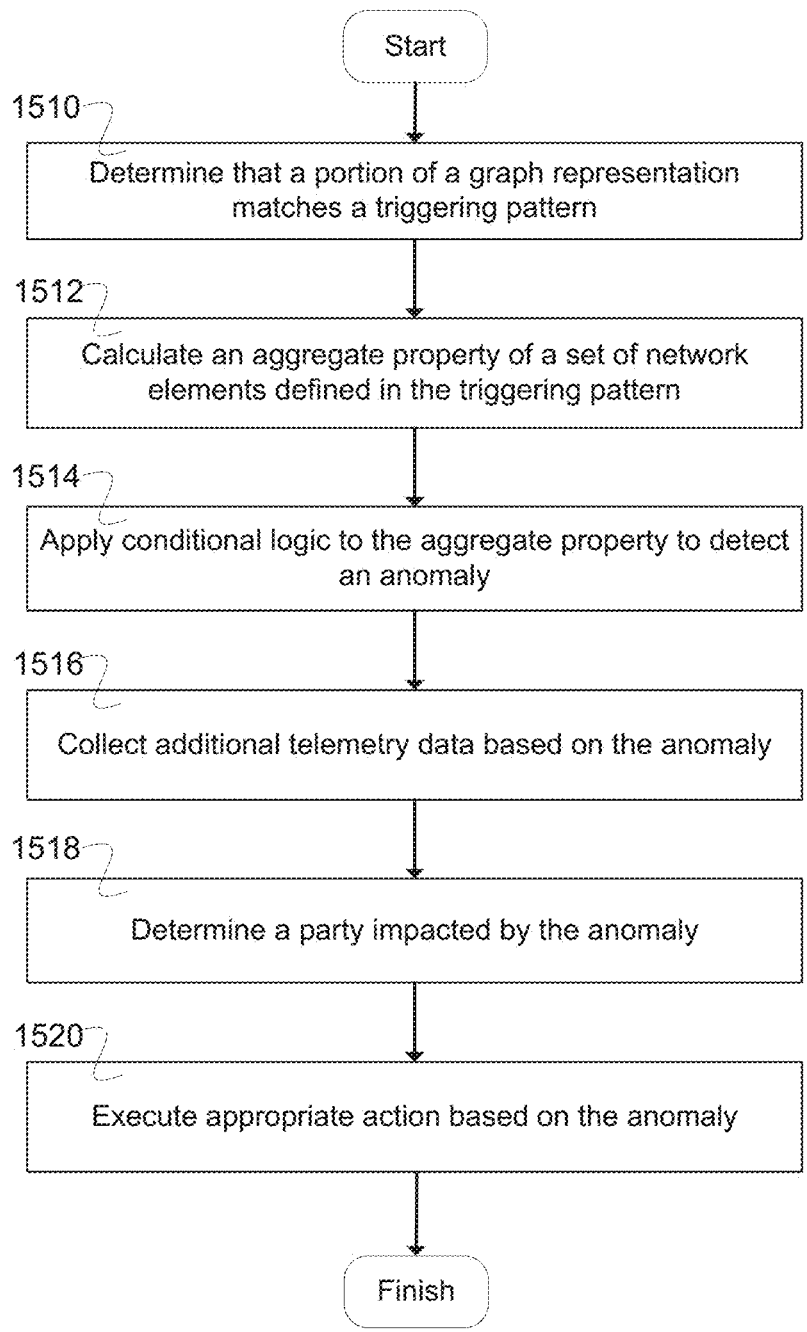
FIG. 15 is a flow diagram illustrating an embodiment of a process to detect and respond to an anomaly.

FIG. 15 is a flow diagram illustrating an embodiment of a process to detect and respond to an anomaly. In some embodiments, the system is used to collect network telemetry data, analyze the network, and respond appropriately in a closed loop. Anomalies, actionable signals, impact analysis, or any other appropriate information may be extracted from raw telemetry data. For example, detecting a service, device, or functional component outage (e.g. via telemetry data) may be followed up with a determination of affected consumers or a determination and collection of additional telemetry data collection as required. Based on the analysis, appropriate actions to inform impacted parties or remedy the anomaly may be executed.

At 1510, it is determined that a portion of a graph representation matches a triggering pattern. In some embodiments, the triggering pattern defines a set of managed network elements, wherein the managed network elements are monitored for an anomaly. For example, the triggering pattern may comprise a set of links that traffic belonging to a specific virtual network of a specific tenant traverses. At 1512, an aggregate property of the set of network elements is calculated. In various embodiments, a standard deviation, minimum, maximum, average, or any appropriate statistic or property is calculated. For example, a recent history time series for the traffic on each link may be created and run through a watermark aggregator to determine the number of links running over 80% utilization for more than 30 seconds. At 1514, conditional logic is applied to the result to detect an anomaly. In some embodiments, pre-defined conditional logic comprises a threshold value (e.g. maximum or minimum) for the aggregate property and an anomaly is detected in the event the calculated aggregate property is abnormal based on the threshold value. For example, an anomaly may be generated in the event more than five percent of links in the set of links are running over 80% utilization for more than 30 seconds. At 1516, additional telemetry data is collected based on the anomaly. For example, a complete set of tenants that contribute to traffic on the set of links may be determined. At 1518, a party impacted by the anomaly is determined. For example, other virtual networks and tenants that are impacted by the anomaly may be identified. At 1520, appropriate action based on the anomaly is executed. For example, traffic may be redirected to different links or impacted tenants may be asked to decrease utilization of the links.

In some embodiments, the closed-loop telemetry collection, analysis, and response process is automated. In some embodiments, the aggregate property of the set of network elements is continuously monitored based on a time interval (e.g. calculated every five seconds).

In some embodiments, an agent is associated with a triggering pattern that defines a set of managed elements. In some embodiments, the triggering pattern also defines a property of the set of managed elements. For example, "transmitted_bytes," referring to a number of transmitted bytes, is a property of a node of type "link." An agent's associated triggering pattern specifies transmitted bytes of a set of links that traffic belonging to a specific virtual network of a specific tenant traverses by specifying the "transmitted_bytes" property of the set of links. In some embodiments, a function is executed based on a property specified in the triggering pattern to calculate an aggregate property. For example, the agent associated with a triggering pattern that specifies the "transmitted_bytes" property of a set of specified nodes of type "link" may be associated with a callback function that determines the percentage of links (out of links represented by the set of specified nodes of type "link") running over 80% utilization for more than 30 seconds.

In some embodiments, the agent is associated with a set of functions that calculate an aggregate property of the managed elements, apply conditional logic to the aggregate property, detect an anomaly, and store the anomaly data (e.g. information relaying an anomaly exists or relaying details on the anomaly, such as percentage of links that are running over 80% utilization for more than 30 seconds) in the graph representation. For example, a callback function may determine whether the percentage of links running over 80% utilization for more than 30 seconds is over a threshold. In the event the percentage is determined to be over the threshold, an anomaly may be determined to exist and the anomaly data stored. For example, anomaly data may be stored as a property of a node (e.g. "aggregated_traffic" as a property of a node of type "link" that refers to the percentage of links that are running over 80% utilization for more than 30 seconds). In some embodiments, the anomaly data triggers an additional agent. For example, the additional agent may be associated with a triggering pattern that specifies the "aggregated_traffic" property of a set of links that traffic belonging to the specific virtual network of the specific tenant traverses. The additional agent may trigger additional telemetry. For example, a function associated with the additional agent may be defined to determine a complete set of tenants that contribute to traffic on the set of links. In some embodiments, a separate agent is associated with a triggering pattern that specifies a set of impacted parties. For example, the triggering pattern may specify tenants that have virtual networks that have endpoints that are hosted on servers that are connected via links that have aggregated traffic over a threshold value (e.g. nodes of type "tenant" that share an edge with a node of type "virtual_network," wherein the node of type "virtual_network" shares an edge with a node of type "endpoint" that shares an edge of type "hosted_on" with a node of type "server," wherein the node of type "server" shares an edge with a node of type "link," wherein the node of type "link" has a property of "aggregated_traffic.") The separate agent may execute an associated function that alerts the tenants.

In some embodiments, the aggregate property is saved (e.g. as a node property) regardless of whether an anomaly is detected or not. Callback functions that are triggered based on the aggregate property may comprise conditionality (e.g. the function will not be called in the event the aggregate property value is not determined to be an anomaly).

In some embodiments, 1512, 1514, 1516, 1518, and 1520 are represented in a graph representation. In some embodiments, a workflow of processing stages (e.g. the steps described at 1512, 1514, 1516, 1518, and 1520) is represented in a directed acyclic graph. In some embodiments, each step is represented as a node. The order of the flow as shown may be represented via directional edges. For example, a node of type "process_step" may comprise information on calculating an aggregate property of network elements and may have a directional edge that points to another node of type "process_step" comprising information on applying conditional logic to the aggregate property, causing the aggregate property calculation step to be performed before the conditional logic step. In some embodiments, the workflow of processing stages (e.g. the steps described at 1512, 1514, 1516, 1518, and 1520) is represented as a portion of a graph representation and is part of a graph representation of computing infrastructure. In some embodiments, the sequence of steps is represented in a separate graph.

Agents may subscribe to graph elements representing stages and react to them by executing processing that is required. In some embodiments, an agent is associated with a triggering pattern of graph elements representing a processing stage or step. In some embodiments, the agent has an associated callback function that executes processing that is defined or parametrized by the graph elements. For example, in the event of a request for data analytics on a specified node of type "link," a series of nodes of type "process_step" may be created that stem from the specified node of type "link." The series of nodes may comprise a single chain. For example, an edge that points from the specified node of type "link" can be created and join the specified node of type "link" with a subsequently newly created node of type "process_step," wherein the newly created node of type "process_step" has a node property that describes a formula to calculate an aggregate property. Following creation of the node of type "process_step" with a node property that describes a formula to calculate an aggregate property, a new edge that points from the aggregate property calculation node can be created and join the aggregate property calculation node with a subsequently created node of type "process_step" which has a node property that comprises a threshold value. In some embodiments, creation of the nodes of type "process_step" cause agents that are associated with triggering patterns that specify the nodes of type "process_step" to be triggered. The creation of the nodes of type "process_step" may occur one at a time, triggering the agents in a desired order.

For example, an agent with an associated triggering pattern of a property of "transmitted_bytes" of the specified node of type "link" may be associated with a callback function that determines whether the specified node of type "link" has an outgoing edge that points to a node of type "process_step" and in the event the specified node of type "link" does share an outgoing edge with a node of type "process_step," saves the "transmitted_bytes" property value of the node of type "link" to a property of the node of type "process_step." The "transmitted_bytes" property value may be saved under a property of "base_calculation_value" of the node of type "process_step." In some embodiments, calculation of the aggregate property is parametrized by the triggering pattern (e.g. a property conveying transmitted bytes is defined in the triggering pattern and is used as input to a calculation of percentage of overutilized links). For example, an agent associated with a triggering pattern that specifies the "base_calculation_value" property of the node of type "process_step" may cause a callback function associated with the agent to execute a calculation of an aggregate property based on the value saved under the "base_calculation_value" property and a formula saved under a "formula" property of the node of type "process_step." In some embodiments, the aggregate property is saved as a property of the node (e.g. as an "aggregate_property" property value). In some embodiments, values are passed between processing stages by saving them as node or edge properties.

The creation of the second node of type "process_step" that has a node property that specifies a threshold value may trigger an agent that is associated with a triggering pattern that specifies a property of "threshold_value" of the node. A callback function associated with the agent may determine whether an anomaly is present based on the "threshold_value" property value of the second node of type "process_step" and the "aggregate_property" property value of the first node of type "process_step." In the event an anomaly is detected, an "anomaly" property of the second node of type "process_step" may be updated to indicate that an anomaly is present. In various embodiments, processing steps are executed by various configurations of graphical elements (e.g. nodes, properties, and edges) and agents.

FIG. 16 is a flowchart illustrating an embodiment of a process for generating a verification model. The process of FIG. 16 may be implemented on management server 102 of FIG. 1.

At 1602, a set of requirements of a service is received. The service may be a network service and/or other type of service. In some embodiments, the set of requirements includes a set of declarative requirements. For example, declarative requirements may express a desired configuration of network components without specifying an exact native device configuration and control flow. By utilizing declarative requirements, what should be accomplished may be specified rather than how it should be accomplished.

At 1604, a verification model for each device of the set of requirements is generated to verify the status and implementation of the service. In some embodiments, generating the verification model includes using the received set of requirements along with one or more received constraints associated with the set of requirements to determine a more complete set of requirements to be utilized to generate one or more verification models and one or more device configurations. In some embodiments, validation test procedures are executed and the results are compared against generated expectations. In some embodiments, the received set of requirements has been processed to include information such as a cabling diagram/map. For example, the set of requirements received in 1602 can be processed to specify topology of connections between network components.

At 1606, each generated verification model is provided to each respective device of one or more devices that are utilized to implement the desired service. In some embodiments, providing the generated verification model includes sending the generated verification model to an agent of the respective device. For example, an agent of management server 102 of FIG. 1 may send a generated verification model to an agent of network device 106 of FIG. 1 and send another generated verification model to proxy an agent of network device 108 of FIG. 1. In some embodiments, providing each generated verification model includes storing each generated verification model in data of nodes of a graph representation stored in a data store (e.g., data store 104 of FIG. 1) to allow one or more agents to read and access its respective verification model from the nodes of the graph representation. Thus, rather than directly communicating the verification models to devices, an agent stores the verification models to the nodes of a graph representation to communicate the information.

In some embodiments, a graph representation is verified to ensure that it conforms to a schema that defines allowed elements of the graph representation and how the graph representation is allowed to be structured/connected. For example, an agent that is triggered by a new/modified element or connection of the graph representation may execute via its callback function a verification of the new/modified element or connection to ensure that it satisfies the rules of the schema. In some embodiments, verification is performed during monitoring of a computer network (e.g., monitoring the computer network for problems or anomalies). In some embodiments, verification is performed when configuring a computer network (e.g., configuring a new computer network for operation based on declarative requirements).

FIG. 17 is a flowchart illustrating an embodiment of a process for detecting status parameters. The process of FIG. 17 may be implemented on network device 106 and/or network device 108 of FIG. 1. For example, at least a portion of the process of FIG. 17 may be performed by one or more agents of network device 106 and/or network device 108 of FIG. 1.

At 1702, a verification model is received. In some embodiments, an agent receives a verification model. The agent may be an agent configured to handle the verification using the verification model. In some embodiments, the received verification model is the verification model provided in 1606 of FIG. 16. For example, an agent of a device being verified may obtain the verification model from another agent.

In some embodiments, the received verification model is the verification model provided in 1606 of FIG. 16 for a device of the agent. In some embodiments, receiving the verification model includes detecting (e.g., via a matching triggering pattern) that the verification model has been stored in a node of a graph representation. In some embodiments, the verification model includes a list of one or more connections and associated parameters of the connections, and the associated device/agent of the verification model is to report/verify the existence, status, and/or parameters of the listed connections.

In some embodiments, the verification model includes a list of one or more service processes that should be operating on the associated device of the verification model and the associated device/agent is to report/verify the existence, status, and/or parameters of the listed service processes. In some embodiments, the verification model includes a list of one or more IP addresses that should be configured and are operating on the associated device of the verification model and the associated device/agent is to report/verify the existence, status, and/or parameters of the listed IP addresses. In some embodiments, the verification model includes a list of one or more interfaces of the associated device that should be verified and the associated device/agent is to report/verify the existence, status, and/or parameters of the listed interfaces. In some embodiments, the verification model includes a list of one or more connections between interfaces of the associated device and the other connected device that should be configured and operating and the associated device/agent is to report/verify the existence, status, and/or parameters of the listed interface connections. In some embodiments, the verification model includes a list of one or more device identifications of the associated device and the associated device/agent is to report/verify the existence, status, and/or parameters of the listed device identifications.

At 1704, one or more parameters to be reported to verify the verification model are determined. In some embodiments, the verification model identifies the one or more parameters. For example, the verification model may include a list of parameters of interest and a status/verification of each of these parameters that are to be reported. Examples of the parameters and status include parameters/status of connection sessions, services, IP addresses, interfaces, interface connections, device configurations, device properties, ports, quality of service metrics, etc. In some embodiments, the verification model identifies a higher conceptual item to be verified rather than specific parameters to be verified and one or more parameters that need to be verified to verify the item are identified. For example, the verification model may identify a connection to be verified and one or more parameters of the connection that need to be verified are identified. In some embodiments, determining the one or more parameters includes generating a list of status parameters that need to be detected from the device based on the verification model. In some embodiments, determining the one or more parameters includes identifying device/operating system specific parameters to be verified to verify an item of the verification model. For example, the verification model may include a verification instruction/parameter that is not specific to a particular device type and/or device operating system and an agent translates the verification instruction to a device type/operating system specific instruction/parameter. By allowing the protocol/format/instruction of the verification model to be specific vendor/operating system agnostic, generation of the verification model is simplified. Because each agent may be specific for a particular type of device vendor/operating system, the agent is the most efficient entity to perform the translation between a generic verification item of the verification model to a specific item particular to the device.

At 1706, the determined parameters are detected. In some embodiments, parameter detection is performed when the verification model is received. For example, an initial verification may be performed to ensure that the service of the verification model has been properly initialized/configured in the graph representation. In some embodiments, parameter detection is performed periodically. For example, verification may be performed at a periodic interval on an ongoing basis to ensure proper functioning of the service continually. In some embodiments, parameter detection is performed periodically (e.g., every periodic interval). In some embodiments, parameter detection is performed dynamically. For example, when a potential material change is detected (e.g., in the graph representation), parameter detection may be invoked and performed to ensure that the service is properly functioning despite the change. Examples of the change may include a change to one or more of the following: a network connection, a device hardware, a device operating system, an application of the device, an error event, and any status of the device associated with the verification model. In another example, when a device (e.g., switch) operating system is informed about a change (e.g., changes to a route/routing table), the operating system may notify the agent that in response triggers parameter detection.

In some embodiments, detecting the determined parameters includes obtaining a status of a parameter. For example, a status of a network connection may be obtained. In another example, it may be determined whether an identified process is still functioning. In some embodiments, detecting the determined parameters includes obtaining a value of a parameter. For example, a network identifier (e.g., IP address) of an identified network connection may be determined. In some embodiments, detecting the determined parameters includes obtaining information reported to the device from another device. For example, the device performing the verification detection may receive status reports/messages from its neighbor devices and information included in these reports/messages is obtained. In some embodiments, detecting the determined parameters includes performing an inquiry to another device connected to the device performing the verification detection. For example, an inquiry message may be sent to another device to detect the parameter. In another example, a ping message or a request for information may be sent. In some embodiments, detecting the determined parameters includes obtaining a received message from a connected node/device identifying a parameter/status. For example, a Link Layer Discovery Protocol (LLDP) message may be received from a peer switch and this message is reported/analyzed to perform verification.

At 1708, the detected parameters are reported. For example, one or more of the detected parameters may be detected by one or more agents (e.g., an agent of management server 102 of FIG. 1 that is tasked with performing the verification) and stored in one or more nodes of the graph representation. In some embodiments, reporting the detected parameters includes performing an analysis to determine a verification result. For example, one or more detected parameters are detected by agents that are triggered by a change to parameters of a node of the graph model and the callback function of the agent may perform a comparison with one or more expected values of the parameters to determine whether the expected values have been detected and an identification of the result of the comparison is included in a report. In some embodiments, reporting detected parameters includes determining, using a callback function of an agent triggered by an associated triggering pattern, a summary of one or more of the detected parameters. For example, the detected parameters can be categorized, organized, analyzed, tallied, and/or statistically analyzed and one or more results can be included in a provided report.

In some embodiments, reporting detected parameters includes storing a report in one or more nodes of the graph representation and/or providing the report to a user. In some embodiments, the report includes a determined aggregated summary/count of one or more parameters. For example, the number of interfaces that are active, inactive, expected, etc. may be determined and included in the report in addition to a listing of individual status/parameters (e.g., status identifier, status last update time, etc.) of each interface. In another example, the number of sessions (e.g., BGP sessions) that are active, inactive, expected, etc. may be determined and included in the report in addition to a listing of individual status/parameters (e.g., session state, status last update time, source/destination IP address/ASN, etc.) of each session. In some embodiments, the report includes identification of LLDP messages and one or more parameters (e.g., identification of sending/receiving interfaces and devices, message timestamps, etc.) of the messages that have been exchanged between the device and its peer device.

FIG. 18 is a flowchart illustrating an embodiment of a process for analyzing verification reports. The process of FIG. 18 may be implemented on management server 102 of FIG. 1. In some embodiments, at least one or more portions of the process of FIG. 18 are performed by one or more agents.

At 1802, one or more reports of detected parameters of one or more verification models are received. In some embodiments, the received reports are reports provided in 1708 of FIG. 17 from one or more different agents at one or more instances. For example, a report may be received from each device that has been configured to provide a service being verified. In some embodiments, receiving the reports includes receiving the reports directly from one or more devices. In some embodiments, receiving the reports includes obtaining/receiving the reports from one or more nodes of a graph representation.

At 1804, the reports are analyzed. For example, reported data included in the received reports can be correlated, compared, and otherwise analyzed to determine whether the service has been properly implemented/configured and/or is properly functioning. In some embodiments, one or more expected values and/or expected status corresponding to a properly functioning state of the service are known and the reports are analyzed to verify that the expected values/status have been detected. In some embodiments, analyzing the reports includes determining whether an error message and/or an indication of an unexpected state has been reported in the reports.

In some embodiments, an expectation associated with the received reports is verified. For example, one or more rules or tests can be performed to verify that a value included in the report is as expected, specified, and/or within a range. In some embodiments, the expectation includes one or more tests to be performed to verify that a set of requirements has been successfully achieved. For example, a received set of network requirements may specify one or more tests to be performed to verify that the set of network requirements has been successfully achieved. For example, in an L3 Clos network, a test to verify that routing tables have been successfully updated and leaf switch nodes are aware of neighbors to reflect the Clos network configuration may be received along with the received network requirements. This test may be published by one or more agents and one or more agents may receive the test as the expectation for verification. In some embodiments, the expectation identifies an acceptable range for a resource utilization indicator. In some embodiments, the expectation identifies an error state of the received status.

In some embodiments, performing the analysis includes determining that throughput and/or quality of service/performance metrics are met. In some embodiments, performing the analysis includes determining whether all required connections between devices to provide the desired service have been properly configured/detected across all reports from the devices providing the service. For example, rather than merely checking each report in isolation, data reported in multiple reports from different devices may be correlated to determine that connection data/parameters between two devices that are supported to be connected match to create a valid connection. In some embodiments, performing the analysis includes determining whether one or more parameters/connections that are extraneous (or not supposed to exist to provide the desired service) exist. In some embodiments, performing the analysis includes verifying isolation of domains and/or ensuring that one domain is not overutilizing resources.

At 1806, an action, if applicable, is performed based on the analysis of the reports. In some embodiments, no action is performed if the data included in the received reports is as expected, specified, and/or within a range. For example, it may be determined that the service is properly functioning and/or has been properly configured. In some embodiments, it is determined that the service is not properly functioning and/or has not been properly configured and a message is provided to indicate this error (e.g., via an agent). In some embodiments, an expectation identifies the responsive action to be performed based on the data of the received reports. In some embodiments, performing the action includes reporting a data of the reports. For example, a result of a test may be reported (e.g., report a result of a test to verify that the set of network requirements has been successfully achieved). In some embodiments, reporting the data of the reports includes summarizing data of the reports. Reporting the data of the reports may include providing the report/status to an agent (e.g., the agent may provide the report/status to a user).

In some embodiments, performing the action includes configuring, moving, removing, and/or adding a device of a network and/or a process/program of a device of the network. For example, an agent may generate instructions (e.g., publish device requirements to a system data store for an agent to implement on a device) to automatically mitigate/fix an error indicated by the status (e.g., repair/replace a device that has encountered an error). In one example, when an agent provides a status update that its associated device is overloaded, the agent may add a new device to a network to offload processing and/or move a processing task of the overloaded device to another network device. The collected status information may be provided by an agent as a report and/or a request for action.

In some embodiments, performing the action includes allowing an agent that is configured to perform the action to perform the action. For example, an agent that has determined that the received status indicates that the action should be performed informs another agent (e.g., due to detecting a triggering pattern of the agent) to perform the action.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
    configuring, by a processing system comprising one or more processors, a set of network devices to generate collected data, wherein the set of network devices are interconnected within an existing computer network;
    receiving, by the processing system, the collected data from the set of network devices of the existing computer network, the collected data comprising telemetry information and configuration information for the existing computer network;
    generating, by the processing system, a declarative requirement of the existing computer network using both the telemetry information and the configuration information received from the set of network devices, wherein generating the declarative requirement comprises representing at least a portion of the existing computer network as a graph representation of a set of connected computer network elements using both the telemetry information and the configuration information received from the set of network devices, wherein the graph representation of the set of connected computer network elements comprises a plurality of nodes and a plurality of edges and wherein the graph representation of the set of connected computer network elements indicates the configuration information received from the set of network devices of the existing computer network; and
    monitoring, by the processing system, the set of network devices based on the set of attributes specified by the edge of the plurality of edges of the graph representation of the set of connected computer network elements.

2. The method of claim 1, further comprising receiving, by the processing system, a specification of one or more network intent constraints, wherein generating the declarative requirement is further based on the received specification of the one or more network intent constraints.

3. The method of claim 2, wherein generating the declarative requirement comprises determining a correlation between the received specification of the one or more network intent constraints and the collected data.

4. The method of claim 3, wherein the received network intent constraints include one or more of constraints implicit to a reference network type associated with the existing computer network or constraints associated with a specific computer network.

5. The method of claim 1, wherein configuring the set of network devices comprises outputting an agent configured to execute on a network device of the set of network devices to cause the network device to generate the collected data.

6. The method of claim 1, further comprising determining, la the processing system, a reference network type associated with the existing computer network, wherein generating the declarative requirement is further based on the reference network type.

7. The method of claim 6, wherein the reference network type includes a network architecture in which each switch in a leaf layer of switches is interconnected with each switch in a spine layer of switches in a full mesh topology.

8. The method of claim 6, wherein generating the declarative requirement comprises populating a plurality of schema groups specific to the determined reference network type.

9. The method of claim 1, further comprising determining, by the processing system, that a portion of the graph representation corresponds to a triggering pattern and, in response to the determination that the portion of the graph representation corresponds to the triggering pattern, invoking a specified response.

10. The method of claim 1, further comprising validating the existing computer network using the declarative requirement.

11. The method of claim 10, further comprising monitoring, la the processing system, the validated existing computer network for one or more of an anomaly, a problem, a fault, or an error.

12. The method of claim 10, wherein validating the existing computer network includes generating one or more verification models.

13. The method of claim 10, further comprising:
  determining, by the processing system, that a change to the validated computer network has occurred; and
  automatically configuring, by the processing system, the validated computer network in response to the determination of the change.

14. The method of claim 1, wherein the set of network devices of the existing computer network are operating and have not been provisioned using intent based networking tools when configuring the set of network devices to generate the collected data.

15. The method of claim 1, wherein the declarative requirement indicates a configuration of the set of network devices of the existing computer network without specifying a native device configuration.

16. The method of claim 1, wherein the configuration information comprises an indication of connectivity between the set of network devices of the existing computer network.

17. The method of claim 1, further comprising, determining, by the processing system, one or more connections of a network device of the set of network devices interconnected within the existing computer network based on the collected data, wherein generating the declarative requirement of the existing computer network is based on the determined one or more connections of the network device.

18. A system comprising one or more processors, the system configured to:
  configure a set of network devices to generate collected data, wherein the set of network devices are interconnected within an existing computer network;
  receive the collected data from the set of network devices of the existing computer network, the collected data comprising telemetry information and configuration information for the existing computer network;
  generate a declarative requirement of the existing computer network using both the telemetry information and the configuration information received from the set of network devices, wherein, to generate the declarative requirement, the system is configured to represent at least a portion of the existing computer network as a graph representation of a set of connected computer network elements using both the telemetry information and the configuration information received from the set of network devices, wherein the graph representation of the set of connected computer network elements comprises a plurality of nodes and a plurality of edges and wherein the graph representation of the set of connected computer network elements indicates the configuration information received from the set of network devices of the existing computer network; and
  monitor the set of network devices based on the set of attributes specified by the edge of the plurality of edges of the graph representation of the set of connected computer network elements.

19. The system of claim 18, further comprising a data store, wherein the system is configured to store the collected data at the data store.

20. Non-transitory computer-readable media comprising instructions for causing a processing system comprising one or more processors to:
  configure a set of network devices to generate collected data, wherein the set of network devices are interconnected within an existing computer network;
  receive the collected data from the set of network devices of the existing computer network, the collected data comprising telemetry information and configuration information for the existing computer network;
  generate a declarative requirement of the existing computer network using both the telemetry information and the configuration information received from the set of network devices, wherein, to generate the declarative requirement, the instructions further cause the processing system to represent at least a portion of the existing computer network as a graph representation of a set of connected computer network elements using both the telemetry information and the configuration information received from the set of network devices, wherein the graph representation of the set of connected computer network elements comprises a plurality of nodes and a plurality of edges and wherein the graph representation of the set of connected computer network elements indicates the configuration information received from the set of network devices of the existing computer network; and
  monitor the set of network devices based on the set of attributes specified by the edge of the plurality of edges of the graph representation of the set of connected computer network elements.

\* \* \* \* \*